United States Patent
Juve

(10) Patent No.: US 12,042,087 B2
(45) Date of Patent: Jul. 23, 2024

(54) METHOD AND APPARATUS FOR IMPROVING THE CONSISTENCY OF ESPRESSO SHOTS

(71) Applicant: NuBru, LLC, Vancouver, WA (US)

(72) Inventor: Ronald A Juve, Sammamish, WA (US)

(73) Assignee: NuBru, LLC, Vancouver, WA (US)

( * ) Notice: Subject to any disclaimer, the term of this patent is extended or adjusted under 35 U.S.C. 154(b) by 589 days.

(21) Appl. No.: 17/226,347

(22) Filed: Apr. 9, 2021

(65) Prior Publication Data

US 2021/0219772 A1    Jul. 22, 2021

Related U.S. Application Data

(62) Division of application No. 16/032,974, filed on Jul. 11, 2018, now Pat. No. 11,006,779.

(60) Provisional application No. 62/531,120, filed on Jul. 11, 2017.

(51) Int. Cl.
| | |
|---|---|
| A47J 31/52 | (2006.01) |
| A47J 31/00 | (2006.01) |
| A47J 31/46 | (2006.01) |

(52) U.S. Cl.
CPC ......... *A47J 31/5255* (2018.08); *A47J 31/002* (2013.01); *A47J 31/467* (2013.01); *A47J 31/5251* (2018.08)

(58) Field of Classification Search
CPC ...... A47J 31/5255; A47J 31/002; A47J 31/40; A47J 31/525
See application file for complete search history.

(56) References Cited

U.S. PATENT DOCUMENTS

| | | | |
|---|---|---|---|
| 2,829,664 | A | 4/1958 | Mountford |
| 3,732,887 | A | 5/1973 | Hayner |
| 4,056,050 | A | 11/1977 | Brown |
| 4,583,449 | A | 4/1986 | Dangel et al. |
| 4,922,809 | A | 5/1990 | Führer |
| 5,980,965 | A | 11/1999 | Jefferson, Jr. et al. |
| 6,382,083 | B2 | 5/2002 | Schmed |
| 6,615,667 | B2 | 9/2003 | Smith |
| 6,845,704 | B2 | 1/2005 | Lassota et al. |
| 7,225,728 | B2 | 6/2007 | Lyall, III |
| 7,481,240 | B2 | 1/2009 | Nagaoka et al. |
| 7,717,026 | B1 | 5/2010 | Lassota |
| 8,107,803 | B1 | 1/2012 | Hannah et al. |
| 8,124,150 | B2 | 2/2012 | Doglioni Majer |

(Continued)

FOREIGN PATENT DOCUMENTS

| | | |
|---|---|---|
| AU | 2014227483 A1 | 10/2015 |
| CA | 1068925 | 1/1980 |

(Continued)

OTHER PUBLICATIONS

Preliminary Rejection prepared by the Korean Patent Office for KR10-1021-7021745, Sep. 27, 2021, 7 pages.

(Continued)

*Primary Examiner* — Hong T Yoo
(74) *Attorney, Agent, or Firm* — Chernoff, Vilhauer, McClung & Stenzel LLP

(57) ABSTRACT

An espresso brewing system to dynamically control the flow rate of water during pre-infusion and extraction to improvement shot consistency. Simple user controls create a programmatic "brewing environment" which allows shots to be very repeatable and shared, allowing shots to be reproduced on other machines with this system.

14 Claims, 19 Drawing Sheets

(56) References Cited

U.S. PATENT DOCUMENTS

| | | |
|---|---|---|
| 8,367,136 B2 | 2/2013 | Doglioni Majer |
| 8,523,094 B2 | 9/2013 | De'Longhi |
| 8,607,690 B1 | 12/2013 | Bresciani et al. |
| 8,663,724 B1 | 3/2014 | Banasik |
| 8,739,687 B1 | 6/2014 | Tacklind et al. |
| 8,850,959 B2 | 10/2014 | Bianchi et al. |
| 8,857,315 B2 | 10/2014 | Kelly et al. |
| 8,876,000 B2 | 11/2014 | Delbreil et al. |
| 8,905,055 B2 | 12/2014 | Greene, III et al. |
| 8,973,435 B2 | 3/2015 | Preston et al. |
| 9,364,117 B2 | 6/2016 | Prefontaine |
| 9,433,318 B2 | 9/2016 | Prefontaine et al. |
| 9,629,498 B2 | 5/2017 | Merelli |
| 9,877,608 B2 | 1/2018 | Doglioni Majer et al. |
| 2005/0274738 A1 | 12/2005 | Tomsic et al. |
| 2007/0227363 A1 | 10/2007 | Verna |
| 2008/0017041 A1 | 1/2008 | Beretta |
| 2008/0050480 A1 | 2/2008 | Doglioni Majer |
| 2009/0013875 A1 | 1/2009 | Widanagamage Don |
| 2009/0013895 A1 | 1/2009 | Muller |
| 2010/0086654 A1 | 4/2010 | Douma |
| 2011/0094390 A1 | 4/2011 | Bianchi et al. |
| 2011/0283889 A1 | 11/2011 | Con et al. |
| 2012/0234183 A1 | 9/2012 | Edwards et al. |
| 2013/0068012 A1 | 3/2013 | Preston et al. |
| 2013/0160657 A1 | 6/2013 | Mahlich et al. |
| 2013/0192472 A1 | 8/2013 | Skalski et al. |
| 2013/0239816 A1 | 9/2013 | Mantilla et al. |
| 2013/0239817 A1 | 9/2013 | Starr et al. |
| 2013/0243919 A1 | 9/2013 | Shrader et al. |
| 2014/0010936 A1 | 1/2014 | Boily et al. |
| 2014/0041528 A1 | 2/2014 | Vanni et al. |
| 2014/0069279 A1 | 3/2014 | Upston et al. |
| 2014/0123857 A1 | 5/2014 | Rego |
| 2014/0123858 A1 | 5/2014 | Rellis |
| 2014/0137746 A1 | 5/2014 | Moran et al. |
| 2014/0137749 A1 | 5/2014 | Marchi et al. |
| 2014/0147560 A1 | 5/2014 | Radhakrishnan et al. |
| 2014/0150663 A1 | 6/2014 | Leforgeais et al. |
| 2014/0150664 A1 | 6/2014 | Corti |
| 2014/0314921 A1 | 10/2014 | Kuempel et al. |
| 2014/0341552 A1 | 11/2014 | Zamlinksy et al. |
| 2015/0064323 A1 | 3/2015 | Prefontaine |
| 2015/0110935 A1 | 4/2015 | Prefontaine |
| 2016/0249761 A1 | 9/2016 | Llopis |
| 2016/0287007 A1 | 10/2016 | Barnett et al. |
| 2017/0068021 A1 | 3/2017 | Wilson |

FOREIGN PATENT DOCUMENTS

| | | |
|---|---|---|
| CA | 2282220 A1 | 3/2000 |
| CA | 2646718 A1 | 10/2007 |
| CA | 2679090 A1 | 8/2008 |
| CA | 2799345 A1 | 11/2011 |
| CA | 2822918 A1 | 10/2012 |
| EP | 1676509 A1 | 7/2006 |
| EP | 2700340 A1 | 1/2007 |
| EP | 2719310 A1 | 9/2013 |
| EP | 2662003 B1 | 9/2015 |
| JP | 2017006674 A | 1/2017 |
| WO | 99/39619 A1 | 8/1999 |
| WO | 02/074144 A2 | 9/2002 |
| WO | 2005/002405 A2 | 1/2005 |
| WO | 2006/127114 A2 | 11/2006 |
| WO | 2009/010190 A1 | 1/2009 |
| WO | 2009/016444 A2 | 2/2009 |
| WO | 2009/049430 A2 | 4/2009 |
| WO | 2010/125326 A1 | 11/2010 |
| WO | 2011/048485 A2 | 4/2011 |
| WO | 2011/147786 A1 | 12/2011 |
| WO | 2012/137185 A1 | 10/2012 |
| WO | 2013/127907 A1 | 2/2013 |
| WO | 2013/128323 A2 | 9/2013 |
| WO | 2014/032110 A1 | 3/2014 |
| WO | 2014/096490 A1 | 6/2014 |
| WO | 2014/106818 A1 | 7/2014 |
| WO | 2015031828 A1 | 3/2015 |
| WO | 2015/055460 A1 | 4/2015 |
| WO | 2017/068021 A1 | 4/2017 |

OTHER PUBLICATIONS

Preliminary Rejection prepared by the Korean Patent Office for KR10-1021-7021744, Oct. 29, 2021, 7 pages.

International Search Report and Written Opinion prepared by the US Receiving Office for related PCT/US2018/041693, Nov. 9, 2018, 9 pages.

International Preliminary Report on Patentability prepared by the US Receiving Office for PCT/US2018/041693, Nov. 8, 2019, 109 pages.

Extended European Search Report prepared by the European Patent Office for EP 20156611, Jun. 29, 2020, 7 pages.

Extended European Search Report prepared by the European Patent Office for EP 3651583, Apr. 7, 2021, 9 pages.

Office Action prepared by the US Patent and Trademark Office for U.S. Appl. No. 16/032,974, Apr. 2, 2020, 29 pages.

Pre Infusion Table example

| Pre Infusion Table | | | | | |
|---|---|---|---|---|---|
| Puck Pressure (Gauge) PSI | Flow Rate Oz/sec | Puck Pressure (Gauge) PSI | Flow Rate Oz/sec | Puck Pressure (Gauge) PSI | Flow Rate Oz/sec |
| 30 | 0.114 | 60 | 0.060 | 120 | 0.025 |
| 31 | 0.111 | 62 | 0.058 | 122 | 0.025 |
| 32 | 0.108 | 64 | 0.056 | 124 | 0.024 |
| 33 | 0.106 | 66 | 0.054 | 126 | 0.024 |
| 34 | 0.103 | 68 | 0.052 | 128 | 0.023 |
| 35 | 0.101 | 70 | 0.050 | 130 | 0.023 |
| 36 | 0.099 | 72 | 0.048 | 132 | 0.022 |
| 37 | 0.096 | 74 | 0.046 | 134 | 0.022 |
| 38 | 0.094 | 76 | 0.045 | 136 | 0.021 |
| 39 | 0.092 | 78 | 0.043 | 138 | 0.021 |
| 40 | 0.090 | 80 | 0.042 | 140 | 0.020 |
| 41 | 0.088 | 82 | 0.040 | 142 | 0.020 |
| 42 | 0.086 | 84 | 0.039 | 144 | 0.020 |
| 43 | 0.084 | 86 | 0.038 | 146 | 0.019 |
| 44 | 0.083 | 88 | 0.037 | 148 | 0.019 |
| 45 | 0.081 | 90 | 0.036 | 150 | 0.018 |
| 46 | 0.079 | 92 | 0.035 | 152 | 0.018 |
| 47 | 0.078 | 94 | 0.034 | 154 | 0.018 |
| 48 | 0.076 | 96 | 0.033 | 156 | 0.017 |
| 49 | 0.074 | 98 | 0.032 | 158 | 0.017 |
| 50 | 0.073 | 100 | 0.032 | 160 | 0.017 |
| 51 | 0.072 | 102 | 0.031 | 162 | 0.016 |
| 52 | 0.070 | 104 | 0.030 | 164 | 0.016 |
| 53 | 0.069 | 106 | 0.030 | 166 | 0.016 |
| 54 | 0.067 | 108 | 0.029 | 168 | 0.015 |
| 55 | 0.066 | 110 | 0.028 | 170 | 0.015 |
| 56 | 0.065 | 112 | 0.028 | 200 | 0.011 |
| 57 | 0.064 | 114 | 0.027 | | |
| 58 | 0.062 | 116 | 0.026 | | |
| 59 | 0.061 | 118 | 0.026 | | |

FIG. 1

Extraction Table example

| \multicolumn{6}{c|}{Extraction Table} |
|---|---|---|---|---|---|
| Time Seconds | Control Period | Flow Rate oz/sec | Time Seconds | Control Period | Flow Rate oz/sec |
| 0.00 | 0 | 0.0325 | 12.75 | 51 | 0.0362 |
| 0.25 | 1 | 0.0326 | 13.00 | 52 | 0.0362 |
| 0.50 | 2 | 0.0326 | 13.25 | 53 | 0.0363 |
| 0.75 | 3 | 0.0327 | 13.50 | 54 | 0.0364 |
| 1.00 | 4 | 0.0328 | 13.75 | 55 | 0.0365 |
| 1.25 | 5 | 0.0328 | 14.00 | 56 | 0.0365 |
| 1.50 | 6 | 0.0329 | 14.25 | 57 | 0.0366 |
| 1.75 | 7 | 0.0330 | 14.50 | 58 | 0.0367 |
| 2.00 | 8 | 0.0331 | 14.75 | 59 | 0.0367 |
| 2.25 | 9 | 0.0331 | 15.00 | 60 | 0.0368 |
| 2.50 | 10 | 0.0332 | 15.25 | 61 | 0.0369 |
| 2.75 | 11 | 0.0333 | 15.50 | 62 | 0.0370 |
| 3.00 | 12 | 0.0334 | 15.75 | 63 | 0.0370 |
| 3.25 | 13 | 0.0334 | 16.00 | 64 | 0.0371 |
| 3.50 | 14 | 0.0335 | 16.25 | 65 | 0.0372 |
| 3.75 | 15 | 0.0336 | 16.50 | 66 | 0.0373 |
| 4.00 | 16 | 0.0336 | 16.75 | 67 | 0.0373 |
| 4.25 | 17 | 0.0337 | 17.00 | 68 | 0.0374 |
| 4.50 | 18 | 0.0338 | 17.25 | 69 | 0.0375 |
| 4.75 | 19 | 0.0339 | 17.50 | 70 | 0.0375 |
| 5.00 | 20 | 0.0339 | 17.75 | 71 | 0.0376 |
| 5.25 | 21 | 0.0340 | 18.00 | 72 | 0.0377 |
| 5.50 | 22 | 0.0341 | 18.25 | 73 | 0.0378 |
| 5.75 | 23 | 0.0341 | 18.50 | 74 | 0.0378 |
| 6.00 | 24 | 0.0342 | 18.75 | 75 | 0.0379 |
| 6.25 | 25 | 0.0343 | 19.00 | 76 | 0.0380 |
| 6.50 | 26 | 0.0344 | 19.25 | 77 | 0.0380 |
| 6.75 | 27 | 0.0344 | 19.50 | 78 | 0.0381 |
| 7.00 | 28 | 0.0345 | 19.75 | 79 | 0.0382 |
| 7.25 | 29 | 0.0346 | 20.00 | 80 | 0.0383 |
| 7.50 | 30 | 0.0347 | 20.25 | 81 | 0.0383 |
| 7.75 | 31 | 0.0347 | 20.50 | 82 | 0.0384 |
| 8.00 | 32 | 0.0348 | 20.75 | 83 | 0.0385 |
| 8.25 | 33 | 0.0349 | 21.00 | 84 | 0.0386 |
| 8.50 | 34 | 0.0349 | 21.25 | 85 | 0.0386 |
| 8.75 | 35 | 0.0350 | 21.50 | 86 | 0.0387 |
| 9.00 | 36 | 0.0351 | 21.75 | 87 | 0.0388 |
| 9.25 | 37 | 0.0352 | 22.00 | 88 | 0.0388 |
| 9.50 | 38 | 0.0352 | 22.25 | 89 | 0.0389 |
| 9.75 | 39 | 0.0353 | 22.50 | 90 | 0.0390 |
| 10.00 | 40 | 0.0354 | 22.75 | 91 | 0.0391 |
| 10.25 | 41 | 0.0354 | 23.00 | 92 | 0.0391 |
| 10.50 | 42 | 0.0355 | 23.25 | 93 | 0.0392 |
| 10.75 | 43 | 0.0356 | 23.50 | 94 | 0.0393 |
| 11.00 | 44 | 0.0357 | 23.75 | 95 | 0.0393 |
| 11.25 | 45 | 0.0357 | 24.00 | 96 | 0.0394 |
| 11.50 | 46 | 0.0358 | 24.25 | 97 | 0.0395 |
| 11.75 | 47 | 0.0359 | 24.50 | 98 | 0.0396 |
| 12.00 | 48 | 0.0360 | 24.75 | 99 | 0.0396 |
| 12.25 | 49 | 0.0360 | 25.00 | 100 | 0.0397 |
| 12.50 | 50 | 0.0361 | | | |

FIG. 2

Detection Table example

| Detection Table | | | | | |
|---|---|---|---|---|---|
| Puck Pressure (Gauge) PSI | Detection Level | Puck Pressure (Gauge) PSI | Detection Level | Puck Pressure (Gauge) PSI | Detection Level |
| 30 | 0.980 | 60 | 0.958 | 120 | 0.912 |
| 31 | 0.980 | 62 | 0.956 | 122 | 0.910 |
| 32 | 0.979 | 64 | 0.954 | 124 | 0.909 |
| 33 | 0.978 | 66 | 0.953 | 126 | 0.907 |
| 34 | 0.977 | 68 | 0.951 | 128 | 0.905 |
| 35 | 0.977 | 70 | 0.950 | 130 | 0.904 |
| 36 | 0.976 | 72 | 0.948 | 132 | 0.902 |
| 37 | 0.975 | 74 | 0.947 | 134 | 0.901 |
| 38 | 0.974 | 76 | 0.945 | 136 | 0.899 |
| 39 | 0.974 | 78 | 0.944 | 138 | 0.898 |
| 40 | 0.973 | 80 | 0.942 | 140 | 0.896 |
| 41 | 0.972 | 82 | 0.941 | 142 | 0.895 |
| 42 | 0.971 | 84 | 0.939 | 144 | 0.894 |
| 43 | 0.971 | 86 | 0.938 | 146 | 0.892 |
| 44 | 0.970 | 88 | 0.936 | 148 | 0.891 |
| 45 | 0.969 | 90 | 0.935 | 150 | 0.889 |
| 46 | 0.968 | 92 | 0.933 | 152 | 0.888 |
| 47 | 0.967 | 94 | 0.931 | 154 | 0.886 |
| 48 | 0.967 | 96 | 0.930 | 156 | 0.884 |
| 49 | 0.966 | 98 | 0.928 | 158 | 0.883 |
| 50 | 0.965 | 100 | 0.927 | 160 | 0.881 |
| 51 | 0.964 | 102 | 0.925 | 162 | 0.880 |
| 52 | 0.964 | 104 | 0.924 | 164 | 0.878 |
| 53 | 0.963 | 106 | 0.922 | 166 | 0.876 |
| 54 | 0.962 | 108 | 0.921 | 168 | 0.875 |
| 55 | 0.961 | 110 | 0.919 | 170 | 0.873 |
| 56 | 0.961 | 112 | 0.918 | 200 | 0.850 |
| 57 | 0.960 | 114 | 0.916 | | |
| 58 | 0.959 | 116 | 0.915 | | |
| 59 | 0.958 | 118 | 0.913 | | |

FIG. 3

METHOD AND APPARATUS FOR IMPROVING THE CONSISTENCY OF ESPRESSO SHOTS

CROSS-REFERENCE TO RELATED APPLICATIONS

This application is a divisional of U.S. patent application Ser. No. 16/032,974, filed Jul. 11, 2018, now U.S. Pat. No. 11,006,779 which claims benefit of U.S. Provisional Application No. 62/531,120 filed Jul. 11, 2017, the entire disclosures of which are hereby incorporated herein by reference for all purposes.

BACKGROUND OF THE INVENTION

Existing espresso machines lack the ability to accommodate for variations of the physical coffee puck on the extracted shot. These machines use a combination of pressure control and pressure profiles which indirectly control the flow of water into a coffee puck to extract coffee from coffee grinds, with minimal ability to adjust the system to accommodate variations to the coffee or to user preference. Extraction of fluid from the coffee puck ("puck") in the portafilter depends on the characteristics of the puck preparation and coffee grinds, which can change shot to shot as well as during extraction of the shot.

In practice, baristas and other users of espresso machines try to achieve consistency and control of the shot. Resulting shots vary in volume, crema quality, total dissolved solids, and flavor. These variations are dependent on various factors, including variations in grinder performance, dry coffee dose weight ("dose"), tamping force, bean selection, age of beans, and humidity, for examples. Each of these factors can cause differences in puck permeability and resulting espresso shot. Changes in puck permeability changes the back pressure to the espresso machine system, and as a result also changes the flow rate of fluid through the puck. Variations in the puck occur, to some degree, in every shot. The above variations and changes contribute to inconsistency between every shot pulled.

Currently, for the barista to prepare an espresso shot, the barista works with the dose, or amount of dry coffee, and a grinder to get the espresso machine to produce the desired shot weight, which is the target weight of coffee for the shot, extracted in the desired shot time. It usually takes several shots to "dial in" the grinder, to reach a grind size that is desirable. The grinder has to be adjusted multiple times throughout the day as beans and humidity change. These adjustments result in shots that are thrown away, wasting coffee and time.

Once the grinder is set, the barista must manage when to stop the shot, of which, there are several methods. The barista can monitor the color of the shot, shot time and/or shot volume to determine when to stop the espresso machine. These methods require the barista to be attentive during most of the shot, especially near what should be the end of the shot. This occupies the barista's time and adds to the challenge for the barista to steam milk and pay attention to the customer.

Some espresso machines have a "volumetric" dosing feature to stop the machine after a manually-programmed water volume has passed during the process of pulling a shot. Programming this feature usually requires the barista to prepare a shot and start the machine in program mode. The volume is set when the barista stops the shot and the flow meter counts which represents the water volume used is saved by the machine. In this situation, the barista can start a shot and the machine will stop after the programmed number of flow meter counts occur. The machine may indicate the amount of water, in ml for example, which is the amount of water to fill empty space in the path to the puck, saturate the puck and the water in the shot of coffee. Some machines use "Total ml dose" as a barista input. Either method controls an end point, and not how the water moved just through the puck and into the shot cup. The shot could take much less time or much more time than expected and the machine would only know when to stop. If a different shot volume is wanted, the manual programming method would need to be repeated.

SUMMARY OF THE INVENTION

In one embodiment, this invention relates to a method for creating a brewing environment for an espresso shot system, including the steps of entering values for shot weight, shot time, dose, pre-infusion time and extraction target pressure into the system; and extracting a shot from the system in accordance with the entered values.

In another embodiment, this invention relates to a method for determining a flow rate and a pressure progression for infusion of water into an espresso puck in a brewing system from a pre infusion pressure to the extraction target pressure, including the steps of determining an extraction target pressure and a target flow rate for an extraction, calculating a volume of water in the brewing system at the extraction target pressure, and calculating a current volume of water in the brewing system at one system sample period before a time of extraction as the beginning to determine a table of flow rates from the extraction target pressure to a pre infusion pressure.

In another embodiment, this invention relates to a method for determining a flow rate of water for extraction of coffee from an espresso puck during a shot, including the steps of determining an amount of water needed for the shot in accordance with a target shot weight, dose and extraction percent, determining an average flow rate from the amount of water needed and a determined shot time and applying one or more adaptations to the flow rate.

In another embodiment, this invention relates to a system for brewing an espresso shot, the system including a water inlet for accepting water into the system, an outlet puck pressure sensor operatively associated with a puck, a control valve which functions to control a water flow rate from the water inlet into the puck during pre-infusion and extraction periods, a bypass valve for providing a plumbing path through which water passes at a higher flow rate during a fill phase of the shot, a flow meter, associated with the control valve, to measure the water flow rate to communicate how to regulate the water flow according to a pre-infusion and/or extraction tables to the control valve; and a manifold for housing elements of the system.

BRIEF DESCRIPTION OF THE DRAWINGS

For a better understanding of the invention, and to show how the same may be carried into effect, reference will now be made, by way of example, to the accompanying drawings, in which:

FIG. 1 is an example of a Pre-Infusion Table.

FIG. 2 is an example of an Extraction Table.

FIG. 3 is an example of a Detection Table

DETAILED DESCRIPTION

Figure 4:
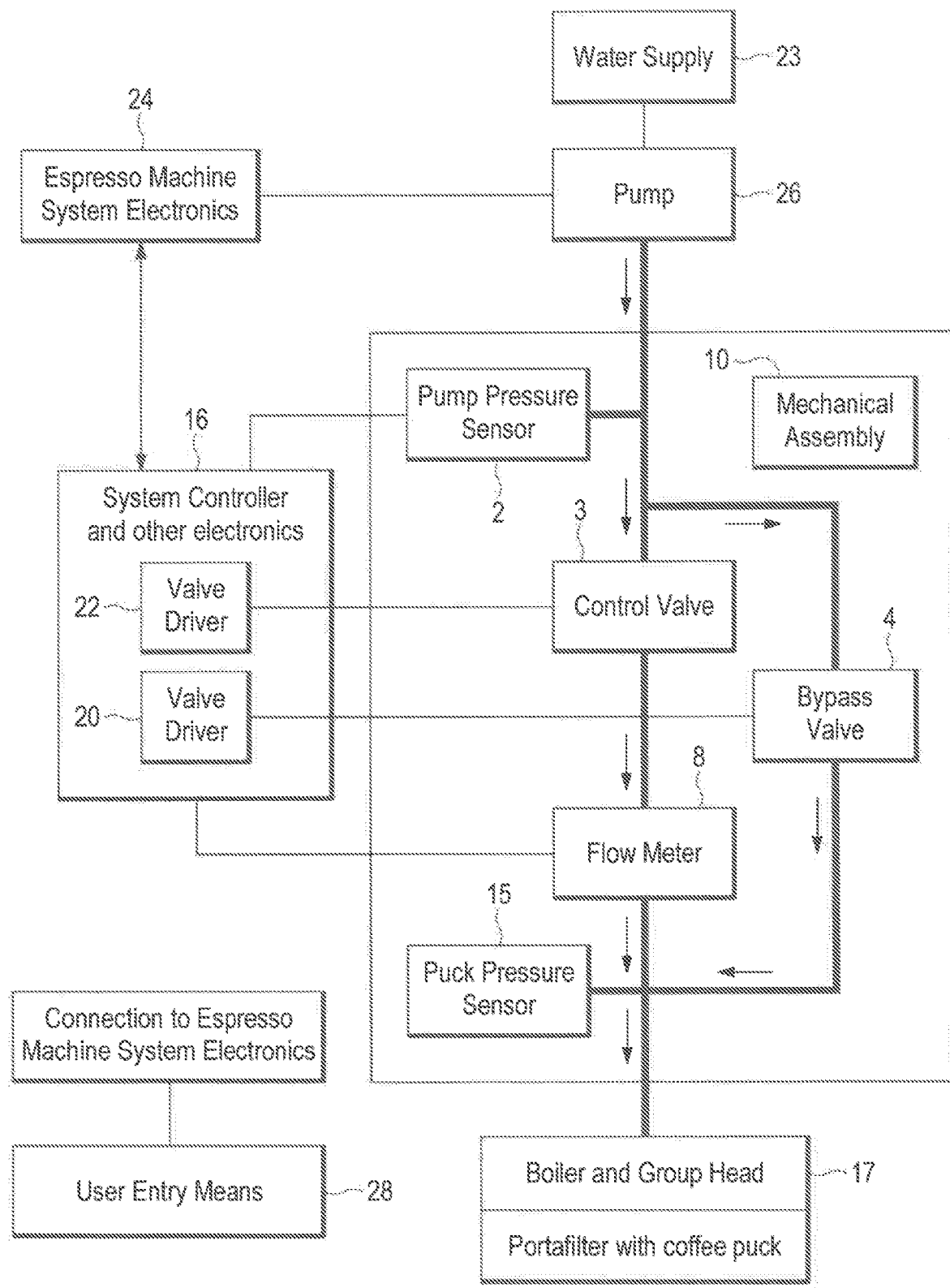
FIG. 4 is diagram representing an embodiment of the system of the invention.

In one embodiment, the present invention dynamically controls the flow rate of water in real time through a puck during pre-infusion and extraction, creating a repeatable brewing environment. Puck pressure is the result of the flow rate of water and puck permeability. Instead of just applying a pressure, which results in a flow rate, an aspect of the present invention controls flow rate which results in a pressure across the puck. Precisely controlled and programmable flow rates makes pre-infusion and extraction repeatable, extraction less sensitive to puck permeability, and water contact time more consistent between shots. The closed loop controls of an embodiment of the system allow for real time compensation of large variations in the puck preparation, and accommodates a wide range of grinder settings and roast dates, and while maintaining consistent shots.

In an embodiment of the present invention, the present method and system avoids the rapid increase in puck pressure that encourages the development of channeling. Channeling occurs when the water, under pressure, finds a path of least resistance and "drills" a hole in the coffee puck. This creates a portion of the shot that is over extracted and leaves the rest of the puck under extracted. Coffee that is over extracted is bitter and coffee that is under extracted is sour.

In another embodiment of the present invention, a plurality of equations is used to generate a list of puck pressures and flow rates for use during pre-infusion, referred to generally as a Pre-Infusion Table. "Pre-infusion" is defined as when the coffee grinds in the puck are initially being infused with water. The term "pre-infusion time" is approximately the time between the beginning of pre-infusion, due to application of a starting pressure, and when the time at which extraction begins, which occurs when the "extraction pressure" is reached. Extraction pressure is a desired target pressure for extraction to begin, however, depending on the puck preparation and resulting puck permeability, extraction may occur before or after the target extraction pressure is reached.

A Pre-Infusion Table used by an embodiment of the present system and method is generated by using predetermined puck pressures and finding the calculated flow rate for that pressure from the calculations that will be described in detail in the following paragraphs. An example of a Pre-Infusion Table is represented in FIG. 1. The table starts at the specified Pre-Infusion Start Pressure, 30 PSI in the current example, with selected pressures at any increment up to pressures above the target extraction pressure. In this embodiment, the pressure is increased by increments of 1 PSI, until the pressure reaches 60 PSI at which the pressure increment increases to 2 PSI. The table continues past the Extraction Target Pressure of 130 up to 170 PSI in this example. Table entries above the Extraction Target Pressure are for the situation when the extraction does not start as expected and the Table continues to apply flow rates as the pressure increases. This slows the pressure increases and allows more time for the extraction to start, reducing how much higher the puck pressure increases above the extraction target pressure.

The pre-infusion start pressure can be entered by the user or determined automatically by the system. An advantage of the system determining the starting pressure is that it amounts to one fewer user inputs and the system can ensure the starting flow rate does not exceed the system capability. If the flow rate is above what the system can deliver, then the starting pressure is raised until the flow rate is at or below the maximum flow rate. If the flow rate is below the measurable flow rate, then the starting pressure is lowered until the flow rate is at or above the minimum flow rate.

The pre-infusion algorithm may calculate flow rates from the puck starting pressure to the puck extraction pressure in a progression that creates a gently increasing puck pressure. This system allows for adaptation to the size of the grind. For instance, if the puck permeability is higher than expected due to courser grinds, the puck pressure does not increase as quickly, and the flow rate remains higher for a longer interval of time to achieve the desired puck pressure. Conversely, if the puck permeability is lower than expected due to finer ground coffee for example, the puck pressure increases more quickly, and the flow rate decreases faster in regard to time to reduce how quickly the puck pressure increases. In another embodiment of the invention, the Pre-Infusion Table may be generated to control water flow rate to have a gently increasing pressure on the puck which can eliminate channeling because, as previously mentioned, channeling is usually caused by excessive pressure and/or finer grinds and leads to over-extracted coffee.

The algorithm used to generate the Pre-Infusion Table calculates a flow rate and pressure progression that may, in one embodiment of the present invention, begin from an initial flow rate at the pre-infusion starting pressure to the extraction flow rate at the extraction target pressure. The primary user inputs for the pre-infusion table algorithm are pre-infusion time, extraction target pressure, dose, shot time, and shot weight. Because the algorithm uses the starting extraction flow rate, the extraction flow rate adjustment user input may also be used which will affect the pre infusion algorithm results. System parameters which the user does not adjust, such as coffee extraction percentage and a value representing the machine's "empty water" volume, are also used in the algorithm. The coffee extraction ratio is the ratio of the dose to the amount of coffee extracted. The typically accepted range of this ratio is 18% to 22%. The espresso machine's "empty water" volume ($V_a$), which requires the knowledge of which basket is in use and the geometry of the group head and plumbing to the three-way valve, may also be used to generate the Pre-Infusion Table values. However, not all inputs are required to generate the table. For example, in one embodiment, a user could enter the starting pre-infusion pressure.

The Pre-Infusion Table Algorithm starts generating the table at the Extraction Target Pressure, a user input, and starting flow rate for the extraction. The starting extraction flow rate takes into consideration the shot weight, extraction ratio, water density adjustment, extraction flow rate adjustment % and shot time. The equation for Water In=Shot Weight−(Dose*Extraction Ratio). In another embodiment, the water density adjustment would be included and the equation would be Water In=(Shot Weight−(Dose*Extraction Ratio))*Water Density Adjustment. The Water Density Adjustment is needed if the water temperature at the flow meter is different than the water temperature in the group head going into the puck. If the water temperature at the puck is higher than the water temperature at the flow meter, the water density is lower at the puck. The same amount of water volume that moves through the flow meter will displace a similar volume in the group head, but is at a lower density. This will make the shot weight low unless there is compensation for the lower density. The Water Density Adjustment is equal to the (water density at the flow meter/water density at the group head). This compensation improves the system so that the user entered "Shot Weight" can be achieved without a "Learning Mode" to determine the amount of water needed for the shot. The starting flow rate is equal to Water In/Shot Time. In another embodiment, the starting flow rate is adjusted by the Extraction Flow Rate Adjustment % and the Starting Flow Rate=(Water in/Shot Time)*(1+Extraction Flow Rate Adjustment %). The system, however, starts the shot at the "empty" volume. As the water flows into the system, the empty volume decreases, and the pressure increases. The volume of interest is the volume of the water into the system or "current volume" and is calculated, as explained herein. In one embodiment of the invention, to generate the Pre-Infusion Table, the current volume of the system at the Extraction Target Pressure is calculated first. The "current volume," is calculated from the following equation when at sea level: current volume (grams)=empty volume of system (grams)*[{absolute puck pressure (PSI)−14.7 (PSI)}/absolute puck pressure (PSI)]. The absolute puck pressure for this first calculation is the target extraction pressure which was entered by the user as gauge pressure, but is converted to absolute pressure. In this embodiment, the conversion used is absolute pressure=gauge pressure+14.7 psi. The current volume or "Water Into the System" equation is derived from the gas law $VP=V_0 P_0$. Water Into the System=$V_0−V=V_0−(V_0 P_0/P)$. An alternate form of the equation would include adiabatic heating and would be $P_0/P=(V/V_0)^\gamma$, where $\gamma$ is gamma and typically in the range from 1.0 to 1.4. A similar derivation would be as before to determine Water into the System.

Next, the previous sample time volume is determined. This is the current volume at one system sample period ($t_{-1}$) before the time at extraction ($t_0$). In this embodiment, that time is 10 ms before the extraction time, however, different sample times may be selected based on system operation preference. The starting extraction flow rate times the system sample period is how much water will flow into the volume in one system sample time (the "calculated delta water volume"). That "calculated delta water volume" in one system sample time is subtracted from the volume at the Extraction Target Pressure, a user input, the result of which is the volume of one system sample (sample $t_{-1}$) prior to the Extraction Target Pressure which is sample to. The volume of the system at $t_{-1}$ is calculated using the following equation: volume of system ($t_{-1}$) (grams)=Volume of system at Extraction Target Pressure (grams)−[(extraction flow rate (grams/sec)*system sample time (seconds)].

In the next step, the previously-calculated volume of the system one sample prior to the Extraction Target Pressure is used to determine the puck pressure at this time. The following equation is used to calculate the puck pressure at the time ($t_{-1}$): Puck pressure ($t_{-1}$)=[$V_a$ volume of system (grams)*14.7 (PSI)]/[$V_a$ volume of system (grams)−Current Volume of the system ($t_{-1}$) (grams)]. The calculated puck pressure establishes the rate of change of the puck pressure when the flow rate is at the extraction flow rate at the Extraction Target Pressure.

Three rates of pressure change coefficients may also be used to generate the Pre-Infusion Table entries. Pre-infusion may start at the pre-infusion starting pressure, then, the puck pressure changes smoothly and reaches the extraction pressure after an elapsed time equal to the user entry of pre-infusion time. This controlled pressure transition is done with calculated flow rates to fill the volume over a time equal to the pre-infusion time entered by the user. The first pressure rate coefficient, $K_{ext}$, is the rate of pressure change at the Extraction Target Pressure and is calculated using the following equation: $K_{ext}$=(Puck pressure at Extraction Target Pressure)/(Puck pressure ($t_{-1}$)), Puck pressure ($t_{-1}$) being the puck pressure one system sample prior to Extraction Target Pressure. The Extraction Target Pressure is a user input. Pressures are absolute pressures.

The second pressure rate coefficient, $K_{ave}$, the average rate of pressure change from the Pre-Infusion Start Pressure to the Extraction Target Pressure, is partly calculated from the ratio of the Extraction Target Pressure to the Pre-Infusion Start Pressure. The calculation determines the average pressure change per sample over the entire pre-infusion pressure range, raised to the inverse of the total number of samples during pre-infusion: $K_{ave}$=(Extraction Target Pressure/Pre-Infusion Start Pressure)$^{(1/(Pre\ Infusion\ Time * samples\ per\ second))}$. Pre-Infusion time is a user input or it could be a default number. Samples per second is a system parameter and is not a user input. Again, the pressures are absolute pressure.

The third pressure rate coefficient is $K_{spi}$, the K factor at the Pre-Infusion Start Pressure. A combination of $K_{ext}$ and $K_{ave}$ is used to determine the remaining puck pressures in the progression from the first puck pressure, Pressure$_{n-1}$, under the Extraction Target Pressure (pressure$_{n=0}$) to the Pre-Infusion Start Pressure. $K_{spi}$ is determined with the following equation: $K_{spi}=K_{ave}+((K_{ave}-K_{ext})*K_{spi\_adjustment\_factor})$. The $K_{spi\_adjustment\_factor}$ will be further described herein.

When the next lower pressure is calculated, the new volume is calculated, and a flow rate determined for the necessary volume change in the system sample time. The calculation of the "next" pressure uses this equation to determine the $K_n$ factor: $K_n$=[(Pressure$_n$−P$_{Pre\ Inf\ Start\ Pressure}$)/(P$_{extraction}$−P$_{Pre\ Inf\ Start\ Pressure}$)]*($K_{ext}$−$K_{spi}$)+$K_{spi}$.

Pressure$_{n-2}$ is determined by Pressure$_{n-1}$*1/K$_{n-1}$ for n=−2 to (Pre-Infusion Time*system samples in a second). Pressure$_{n=0}$ is the Extraction Target Pressure. Next, a new volume is calculated from:

$$V_{n-2} = V_{empty\ volume\ of\ system}(\text{grams}) * [\text{Pressure}_{n-2} - 14.7\ (\text{PSI})]/\text{Pressure}_{n-2}.$$

The flow rate during $t_{n-1}$ to $t_{n-2}$ is FR$_{n-2}$=(V$_{n-1}$−V$_{n-2}$)/sample time period (seconds), units of flow rate are grams/second. Additionally, an adjustment may be made to this FR$_{n-2}$ to account for adiabatic heating.

This is repeated for each system sample time (10 ms for example) until the calculated pressure is at the Pre-Infusion Start Pressure, which is typically 30 PSI (gauge). The Pre-Infusion Start Pressure should be at "0.000" seconds since this is the start of pre-infusion. The calculated time at the start of pre-infusion may not be at "0.000" seconds. If the initial value of K$_{spi}$ is wrong, then the calculated time at the start of pre-infusion is not at 0.000 seconds. This would occur if the initial value of K$_{spi}$ is not correct.

The K$_{spi\_adjustment\_factor}$ is determined by a recursive routine which changes this term until the time in the generated data table is at the Pre-Infusion Start Pressure is "0.000 seconds". The table is generated starting at the Extraction Target Pressure, the starting extraction flow rate, and at a time equal to the pre-infusion time and works backwards to the Pre-Infusion Start Pressure and a time of "0.000" seconds. When the recursive operation achieves a starting time to "0.000", then the progression of pressure, volume and flow rates have been calculated. The Pre-Infusion Table is designed to transition directly to the Extraction Table for a seamless transition from pre-infusion to extraction.

The Pre-Infusion table continues for pressures above the Extraction Pressure. Variations in the puck may cause the extraction to start above the target Extraction Pressure. The Pre-Infusion Table entries are calculated in a similar manner above the Extraction Target Pressure as were the entries for pressures below the Target Pressure. The difference is the pressures are increasing so that the K$_n$ value is not inverted: Pressure$_{n+1}$=Pressure$_{n=0}$*K$_{n=0}$ for n=0 to as many time intervals as needed to reach 200 PSI. Pressure$_{n=0}$ is the Extraction Target Pressure.

Additional modifications may be made to the system and method of generating a Pre-Infusion Table. Many "shapes" of the transition from the Pre-Infusion Start Pressure to Extraction Target Pressure are possible. One modification of the method described herein is that the slope of pressure increase is maintained to be at or above 1 for example as pre-infusion progresses.

The previous description is one embodiment of a method to generate the Pre-Infusion Table which does not take into account the water flowing into the puck during pre-infusion. One method to estimate the water into the puck is to estimate the space within the volume of the coffee where water can pass. This is done with a density estimate of coffee being about 57% the density of water and the dose. The water into the puck is then distributed in time during fill and pre-infusion. This embodiment uses a linearly decreasing flow rate, starting at the highest flow rate at the beginning of the shot and decreasing to zero at the end of pre-infusion. Time in this equation could be scaled to reduce the time over which the water into the puck is estimated to occur. For a different modification, another method is modeling the puck on shot weight and shot time which represents an average flow rate through the puck. Then the Extraction Target Pressure and the average flow rate through the puck may be used to derive a representative puck permeability. Regardless of the method used to estimate the water flow into the puck, the estimated water will reduce the flow into the volume. The effect would be pre-infusion pressure changes occurring at a slower rate than the model which does not consider the flow into the puck. The water flow into the puck could also be added to the pre-infusion flow rates. This would make the pre-infusion time closer to the actual user input time than the original method.

Another modification of the Pre-Infusion Algorithm determinations may be to make the pre-infusion determination adaptive for the puck behavior. If the puck pressure changes for the given flow rates were evaluated during a given time or pressure change, after the start of pre-infusion, then it is possible to alter the pre-infusion flow rates for a given pressure to change the pre-infusion behavior. The intent is to dynamically compensate for changes in the puck and maintain a more consistent pre-infusion time. For example, if the pressure change is happening much faster than expected during the evaluation interval, then the flow rates could be scaled by a factor to slow the pressure change. Likewise, if the pressure changes were happening slower than expected, then the pre-infusion flow rates could be increased by a factor to increase the rate of pressure change. This would have the effect of making the pressure over time behavior more similar over a range of puck permeability and making the shot behavior more consistent shot to shot.

Another modification can be related to the consistency of a system using the Pre-Infusion Algorithm by measuring time to a pressure during fill to calculate the apparent volume of the system. Water levels in the boiler and plumbing may change from shot to shot depending on the machine configuration which would change the V$_a$ value. This will affect the time to a certain pressure. The time is proportional to the volume of the system and can be used to "scale" the flow rates in the Pre-Infusion Table according to the time to the given pressure in the model. The ratio of the measured time to a pressure to the time calculated in the model is representative of the ratio of the actual volume to the volume used in the model. Flow rates would be multiplied by this ratio or a factor related to this ratio, to compensate for different apparent volumes. If the apparent volume was greater than the model volume, then the flow rates would be increased to compensate and maintain a similar pressure increase during pre-infusion.

The Extraction Table Algorithm generates the Extraction Table, which includes a list of flow rates versus time for extraction. The Extraction Target Pressure is the target pressure at which the expected initial extraction flow rate is reached. An example of an Extraction Table is shown in FIG. 2. In this embodiment, the starting extraction flow rate used is also the pre-Infusion flow rate at the Extraction Target Pressure.

The basic extraction flow rate is calculated from the shot weight and shot time user inputs. Flow rate is shot weight divided by shot time. The Algorithm starts by determining the average flow rate from shot weight and shot time, for example;

Average flow rate=1 ounce/25 seconds=0.040 ounces per second.

The algorithm also calculates the number of control loop updates during the shot from shot time/control loop update time, for example;

25 seconds/0.25 seconds between control updates=100 control loop updates.

For this embodiment, if the shot takes longer than 25 seconds, the last flow rate in the Table continues to be the target flow rate for the remainder of the shot. The flow rates can continue to be unique during the target shot time if preferred. An Extraction Table can be generated with a constant flow rate throughout the shot or with an extraction flow rate adjustment percentage to accommodate the tendency of a shot to start slower and finish faster. The puck permeability will increase during the extraction because material is being removed. Less material results in higher puck permeability. The example Extraction Table shown in FIG. 2 is for a 25 second, 28.5 gram shot with a −10% extraction flow rate adjustment percent. The Table may continue beyond 25 seconds for use in the event that the grinder setting is finer than expected the shot time is extended due to lower puck permeability. In this situation, flow rates can continue to change beyond the shot time (for example, beyond 25 seconds), if preferred. The control loop update time can be more often if preferred for system performance.

The Extraction Algorithm may apply any adaptations to the flow rate that are desired or can further contribute to shot consistency. One adaptation would be to make a linear change in flow rate as the extraction progresses. For example, an extraction flow rate adjustment percent changes the initial flow rate to the opposite proportion of the change in the final flow rate, such that if the initial extraction flow rate is reduced by the adjustment with −5%, the flow rate starts lower by that 5% than the shot weight/shot time calculation. During the shot, the flow rate transitions linearly to the final flow rate which is increased by the adjustment % higher than the shot weight/shot time calculation. This method keeps the shot time constant. In another embodiment, the extraction could start at −10% of the average flow rate and linearly increase to 10% more than the average flow rate at the end of the shot time. This will maintain the original Shot Weight and Shot Time inputs. Percentage adjustment is possible over a wide range. In another embodiment, the Extraction Flow Rate could start at a starting Extraction Flow Rate and then, during the shot, start to reduce the flow rate. The reduction can occur anytime during the shot and be reduced any amount. Furthermore, the water into the puck could be accessed during the shot and the flow rate adjusted to finish at the specified shot time.

Another adaptation would be to start the extraction at a lower than the average flow rate, increase the flow rate through the middle of the extraction and then decrease the flow rate during the last part of the extraction. For instance, in an embodiment is a negative cosine shape starting at −10% of the average flow rate, increasing to +10% in the middle of the shot and then decreasing to −10% at the end of the shot. The transition from −10% to +10% and back to −10% is done in the shape of a negative cosine wave. Any preferred shape adaption could be used.

Dynamic flow rate is an implementable system process that may be applied during both pre-infusion and extraction and creates a repeatable brewing environment that greatly improves shot consistency. The system maintains a consistent application of water to the puck, regardless of the puck permeability, by using precisely controlled flow rates as determined by the Pre-Infusion Table and Extraction Table. If the puck permeability is high, a standard espresso machine would apply a pressure and a high water flow rate would occur. The shot time would be shorter than desired. If the puck permeability was low, the same applied pressure would result in a lower flow rate and longer than desired shot time. This inconsistent flow rate would produce very different shots. Puck permeability differences occur to some degree in every puck. In this system embodiment of the present invention, the water is applied at specific flow rates and the puck pressure is the result of the flow rate and the puck permeability. If the puck permeability is high, the resulting pressure is lower but the flow rate is controlled to the target flow rate, either from Pre-Infusion Table or Extraction Table depending on the state of the shot. If the puck permeability is low, the resulting pressure is higher, but again, the flow rate is controlled to the targets in the tables.

Also, previously mentioned the flow rate can be dynamically controlled depending on puck permeability. The matching of a flow rate to a puck pressure during pre-infusion and/or extraction controls the water into the puck so it is consistent between shots. A controlled flow rate during extraction keeps the water contact time with the puck more consistent which is more important than the applied pressure. This system will produce shots of similar weights and extraction times over a wide range of puck permeability.

Another advantage of this dynamic flow rate control during a shot is that there will be fewer shots thrown away as the grinders are dialed in each day as new beans are used and conditions change during the day. The closed loop dynamic flow rate control greatly reduces the effect of these and other variables in puck preparation resulting in consistent shots as the puck permeability changes.

A user may also use an Extraction Detection Algorithm to look for a change in the puck pressure slope during pre-infusion as an indication of when the extraction starts. This will change the machine operation to "fully" automatic from "semi" automatic. For a typical shot, the pressure increases as the shot time progresses. The rate of change of the puck pressure will start to decrease as the extraction begins as more water is passing through the puck and not into the volume of the machine. This results in a decreasing slope of the puck pressure. For example, if puck pressures are compared over a 2.56 second range, although other ranges may be used, 1.28 seconds of the range is the leading part or most recent puck pressures and the remaining 1.28 seconds are the lagging part or older puck pressures. The ratio of leading puck pressures over lagging puck pressures is the slope. In this example, the difference of the pressures of the samples at the beginning and end of each range represent the slope. The equation is:

$$\text{Slope}=(P_{255}-P_{128})/(P_{127}-P_0),\text{ the subscripts represent the pressure sample number in the 2.56 second range.}$$

For example, using the Extraction Detection Algorithm, a slope of 0.8 was determined to be the indication of the start of extraction. The time at which the slope is 0.8 is 1.28 seconds after the extraction started due to the length the range of observation. The time used as the start of extraction is the time at which the slope was 0.8 minus 1.28 seconds. This calculated time is then the start of extraction. When the target amount of water has flowed into the puck since the start of extraction, the shot is complete, and the espresso machine is stopped since it is operating in fully automatic mode. The amount of water for the shot is determined by the dose, extraction percentage and target shot weight. For example, a 20-gram dose at 19.5% extraction ratio would yield 3.9 grams of coffee into the shot. If the shot weight target was 28.5 grams, then the total water into the puck would be 28.5 grams−3.9 grams=24.6 grams of water. A flow meter in the system measures the water into the puck to determine when the target water goal of 24.6 grams has been reached for a 28.5 gram shot.

An alternate implementation would be to make the slope target adaptive based on the estimated puck behavior during Pre-Infusion Table generation. The slope of the puck pressure can be calculated when the Pre-Infusion Table is generated. A slope target could be determined from these slope estimates and changed dynamically for each set of user inputs for a shot. In this situation, the slope target would not change if the user inputs did not change.

A Detection Table may also be generated by creating a list of pressures similar to the Pre-Infusion Table with each pressure paired with a detection level. The system calculation of actual puck pressure slope would be compared to the detection levels and when the puck pressure slope was at or below the detection level for the current puck pressure, then the start of extraction would be recorded in the system.

Another adaptation is to use the Detection Table to look up a "detection level" at the current puck pressure and compare it to a value that represents the calculated slope at the current puck pressure as shot progresses through pre-infusion. An example of a detection table is shown in FIG. 3. The slope of the puck pressure changes with the profile and throughout pre-infusion. Using a Detection Table generated for the profile in use would follow the puck behavior dynamically and detect extraction more accurately than fixed detection level. The Detection Table could include detection levels that are a "scaled" value of the calculated puck pressure slope. The calculations of slope determined during the Pre-Infusion Table generation are slopes that represent water flowing into the system volume and not into the puck. Water flowing for extraction is water not contributing to the increase of pressure during pre-infusion which slows the rate of pressure increase and reduces the slope. The scale factor times the calculated slope is an estimate of the slope of the pressure changes when water is flowing into the puck during extraction. For this embodiment, a scale factor of 0.8, for example, is used to determine the detection table values. Other scale factors can be used. Slopes calculated during pre-infusion are determined at a specific puck pressure.

In another embodiment of the present invention, a Delta Pressure, Delta Water Algorithm may be used to compensate for water flow that does not go into the puck after extraction detection. Water that does not go into the puck, but into the system volume, has the effect of increasing the puck pressure and should not be counted as water into the extraction. The water into the volume not accounted for will cause an error in the measurement of the water through the puck, resulting in an error of the shot weight. Since shot consistency is a goal of this system, accounting for the water into the system improves the accuracy of extraction weight of each shot. The algorithm compensates for dry coffee dose, water temperature and water retained in a boiler that was measured and remained to increase pressure.

One embodiment of the Delta Water algorithm determines the peak puck pressure during the shot. That peak pressure is compared to the puck pressure at the start of extraction. The calculation is based on the following equation when at sea level and uses absolute pressures:

$$V_{new} = V_{empty\ volume\ of\ system}(grams) * [P_{puck}(PSI) - 14.7(PSI)] / P_{puck}(PSI)$$

The version of this equation with the two pressures of interest is:

$$V_{adjustment}(grams) = V_{empty\ volume\ of\ system}(grams) * [\{14.7/P_{ext}(PSI)\} - \{14.7/P_{peak}(PSI)\}]$$

An alternative equation at sea level is $V_{empty\ volume\ of\ system}(grams) * [\{14.7/P_{ext}(PSI)\} - \{14.7/P_n(PSI)\}], P_n$=to a puck pressure during extraction.

The result of this equation is the amount of water to be added to the target water into the puck to account for the mentioned water that flows into the system but not into the puck. This may extend the extraction time to improve the accuracy of the extracted shot weight.

Another embodiment of the present invention to improve consistency is to adjust for water density differences between source water and boiler water temperatures. The system flow meter 8 measures incoming source water that displaces water in the boiler or path to the grouphead 17 and further to the portafilter and coffee puck, the components of which are identified in FIG. 4, as will be later described in detail. The density of source water at 50 degrees F. is about 3.9% greater than the boiler water at 203 degrees F. This affects the calculation of water needed for the shot and the flow rates. The amount of water needed for the shot would increase 3.9% in this example.

In another embodiment of the present invention, a Fractional Edge Algorithm may be used to increase the accuracy of the measurement of the water into the system and increase the precision of the control system. The system presented in this disclosure can use a flow meter to measure the flow rate of the water through the system. The system counts output "edges" (either polarity transitions) produced by the flow meter "square wave" output in a given control interval and compares it to the edge count target associated with the target flow rate during pre-infusion or extraction, depending on the state of the shot. The edges during a control interval in a simple system would be only an integer count. Integer counts do not account for the total amount of water that flows before the first edge in a control interval, or for the flow of water after the last edge in the control interval. In this embodiment, the system may use an input to a microcontroller that is connected to a "capture register" that includes, for example, a 32 bit counter operating at a high speed, for example, 20 MHz. For this example, a 20 MHz clock and the shortest control loop interval of 0.050 seconds, the counter can resolve time differences of 1 count out of 1 million counts. The system uses this counter to capture counts that represents the time from the start of the control interval to the first flow meter edge, the time between the edges of the flow meter during the control interval and, and the time from the last flow meter edge to the end of the control interval.

To determine the fractional edges during a control interval, several "counts" from the capture register are used. The "counts" saved, in order, are: start of control interval (0), first flow meter edge(1), flow meter edge(2), flow meter edge(n−1), last flow meter edge(n), and the end of the (current) control interval (0). This is repeated for all control intervals. (n) represents a sample more recent than (n−1). A "period" of the flow meter edges in the control interval is determined by:

$$P(n) = \text{flow meter edge}(n) - \text{flow meter edge}(n-1).$$

Then the fraction f(0) of the edge from the first control interval (0) to the first flow meter edge (1) is determined by:

$$f(0) = [\text{first flow meter edge}(1) - \text{start of control interval}(0)] / [\text{flow meter edge}(-2) - \text{flow meter edge}(-1)].$$

The fraction of the edge from the last flow meter edge (n) to the end of the control interval (n) is determined by:

$$f(n) = [\text{end of control interval}(n) - \text{flow meter edge}(n)] / [\text{flow meter edge}(n)\ \text{flow meter edge}(n-1)].$$

An alternate calculation would be to determine the value "x" of the fractional end of the pulse at the end of a control interval and use 1-x as the value of the starting fraction in the next control interval.

The fractions f(0) and f(n) are then added to the integer edge count, n, for the entire control interval. The entire control interval edge count is compared to the edge counts calculated from the flow rates in the Pre-Infusion or Extraction Table depending on the state of the extraction. If the edge count differs from the target edge count, then the system adjusts the control valve as needed to correct the flow rate.

An error that could occur without this algorithm during a typical extraction flow of 0.050 oz/sec or 114.28 edges per control interval of 0.5 seconds would be a missing edge at the beginning of the control interval and again at the end of the control interval or 2 edges out of 114.28 edges which is a 1.7% error in flow rate and water passed through the system during extraction. This algorithm reduces the error potential to approximately +/-1 count for each fractional edge determination or 2 counts in 0.500 seconds, out of 10,000,000 counts, which is 0.00002%. This is an improvement of many orders of magnitude.

Temperature control of the water into the puck may be a feature of an espresso machine. In another embodiment of the present invention, this system may allow for more accurate water temperature measurement and thermal characterization of an espresso machine because the flow of water representative of brewing espresso during fill, pre-infusion and extraction could be created without coffee in the portafilter and without a flow restrictor is a special portafilter. A record of the fill, pre-infusion and extraction times and flow rates throughout the shot could be used to recreate the shot of interest. The control loop would use these records to control the flow rate during the recorded time intervals to control the flow of water as was done during the shot. This accurate recordation and reproduction of the shot will load the thermal system just as the shot did.

A simple container, with an opening for the water to drain out, and a thermocouple, can be inserted into the group head and would create little back pressure unlike a puck when brewing coffee. A thermocouple holder can be made of much less substantial material than a portafilter could be used and would be less expensive to make than a portafilter. The thermocouple could also be connected to the machine electronics to measure the thermocouple output and not require a special separate meter to read the thermocouple. Calculations and reporting of the temperature performance could be displayed electronically on the machine. Data could also be output in file to read on another computing device.

Programmatic control, as described herein, allows parameters for a brewing environment to be entered and saved. These parameters can be shared amongst other espresso machines with this technology to reproduce the brewing environment and produce a similar espresso shot.

The system disclosed herein could operate in semi-automatic mode: In semi-automatic mode, when a barista starts a shot, the machine moves through fill and then pre-infusion starts, based on previously stored Pre-Infusion Table values. The system can transition into extraction and flow control begins, based on Extraction Table values. The barista determines when to stop a shot at a time, weight or volume. Alternatively, when the extraction starts, the barista can manually indicate extraction such that flow control starts, and shot is stopped at target weight.

The system disclosed herein could also function in fully-automatic mode, wherein a barista starts the shot and the system moves through fill, pre-infusion, extraction detection and extraction. The previously described Pre-Infusion Table and Extraction Table would be used to control the brewing environment of the shot. As previously described, flow control would be utilized to brew the shot. The shot stops at the target shot weight automatically. The system determines when extraction occurs using the previously described Extraction Detection Algorithm. The system measures the appropriate amount of water into the shot for the target shot weight and takes extracted coffee weight into consideration when determining amount of brew water needed (for example, 20 gram dose=>3.9 grams coffee extracted plus 24.6 grams water is a 28.5 gram shot at 19.5% extraction yield.)

The system disclosed herein can also be operated using the paddle control: wherein a barista moves a paddle control of an espresso machine with this system into a pre-infusion position. The machine starts in fill and moves to pre-infusion at the transition pressure. Pre-infusion would be controlled as previously described with the Pre-Infusion Table with flow control. When a shot starts, the barista moves the paddle to brew position. The system transitions to extraction phase and flow control for extraction starts. Extraction would be controlled as previously described with the Extraction Table and flow control. The machine stops automatically when the target shot weight is achieved or the barista can move the paddle to "Off" to stop the shot. Alternatively, the barista moves paddle directly to "brew" position and the machine operates in fully automatic mode.

A profile defines a brewing environment. A profile may include values entered by the user and/or values determined by the system. The basic user entries are shot weight, shot time, dose, pre-infusion time and Extraction Target Pressure. Dose is the amount of coffee used for the shot and pre-infusion time is a user input that describes the amount of time for the water to flow into the puck and for the pressure on the puck to increase the extraction pressure. The Extraction Target Pressure is the "target" pressure for extraction to occur. With only these five parameters, the system can generate a brewing environment. Another user input, Extraction Flow Rate Adjustment % better matches the espresso machine to actual changes in puck permeability. These few parameters may be shared to recreate the brewing environment on other machines that utilize this invention.

Another aspect of a profile are parameters generated as a part of algorithms or constants used by the algorithms and sent to the espresso machine. Two such profiles are Extraction Volume, or the water needed for the shot defined in the profile, and Va, the machine volume used for the Delta Water, Delta Pressure Algorithm, as previously described.

One use of a profile would be for a roaster to determine a preferred profile for a particular variety of beans. The roaster could share the profile to customers who purchase the beans. The customers can enter the profile into a machine with this invention, use the dose in the profile and pull a shot. This does not take into account the actual operating temperature of the machine which could cause differences in the flavor of the coffee.

The profiles allow for a machine to be set up to operate with a particular grinder setting or adjust the grinder to work with a particular profile. This capability does not exist in a standard espresso machine.

In an embodiment of use of the present method and system, software is used in conjunction with an espresso machine that is programmed to set the maximum pressure at which flow control occurs. In one embodiment, maximum pressure is set at 160 psi (11 bar). Above this pressure, the system does not increase flow rate if the target flow rate has not been achieved, which would be the case for a low permeable puck. Flow control resumes when the puck pressure goes below the maximum pressure setting. Monitoring of the flow rate and water into the system continues even when the flow rate control is suspended during puck pressures greater than the programmed maximum. A puck with lower permeability might cause the shot time to be longer than expected. Having a pressure of only 135 PSI (9 bar) like a standard machine without this invention, would cause the shot to take much longer time and more likely have channeling due to the rapid application of pressure, than with this invention.

The following shows the effect of several variables on espresso shot pulling. Such variables have been described herein and are accounted for using the disclosed algorithms and modifications. In the following examples, labelled FIG. 9, FIG. 10 and FIG. 11, the Compak grinder settings vary from finer (−80) to courser (−70, −60), which are relative digital numbers on the Compak grinder, to demonstrate how, as the puck permeability changes, the resulting puck pressure changes but the extraction is the very similar due to flow rate control. Illustrated below, the left "Y" axis is pressure (PSI), right "Y" axis is liquid in grams, "X" axis is time (sec). The coffee out is the solid line, the puck pressure is the dash-dot-dash line and the pump pressure is the dashed line As is viewable in the Figures, the extracted coffee or "coffee out" over time is very similar for the three tests.

Figure 9:
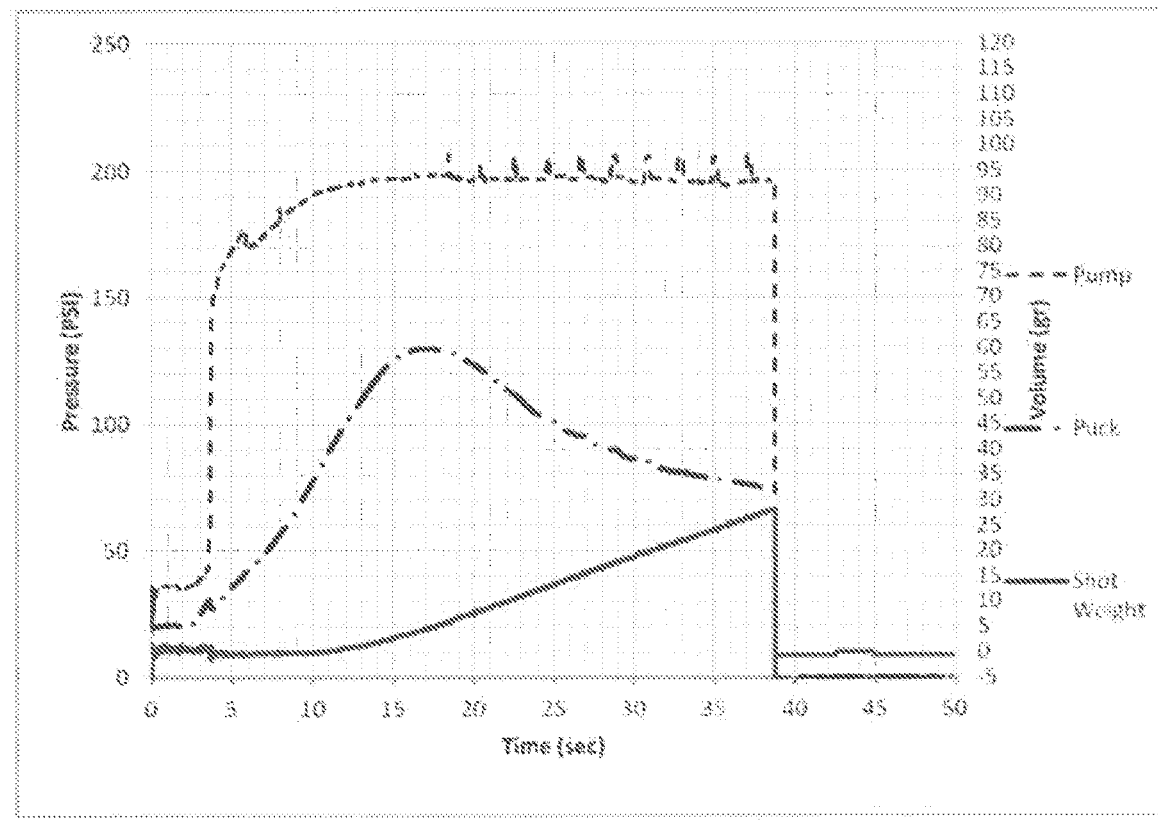
FIG. 9 is a graph of the pressure and volume changes with the grinder set at −80.
Figure 10:
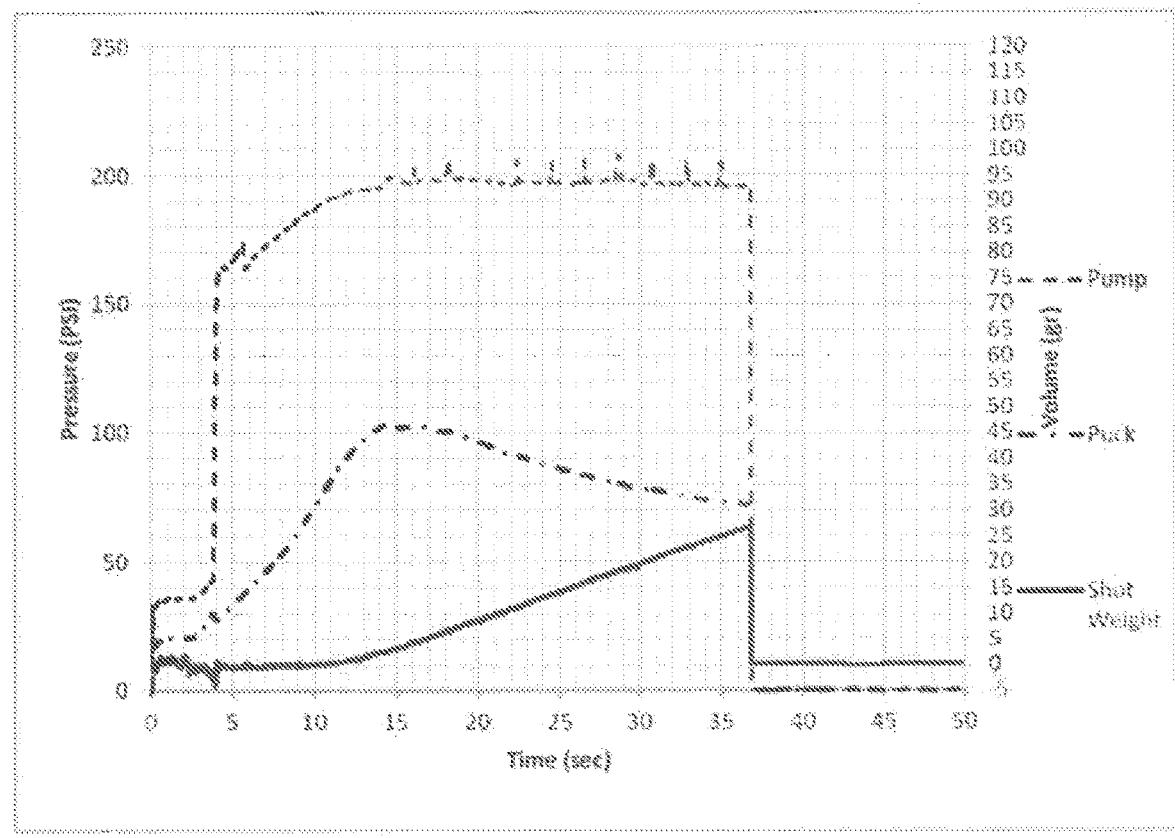
FIG. 10 is a graph of the pressure and volume changes with the grinder set at −70.
Figure 11:
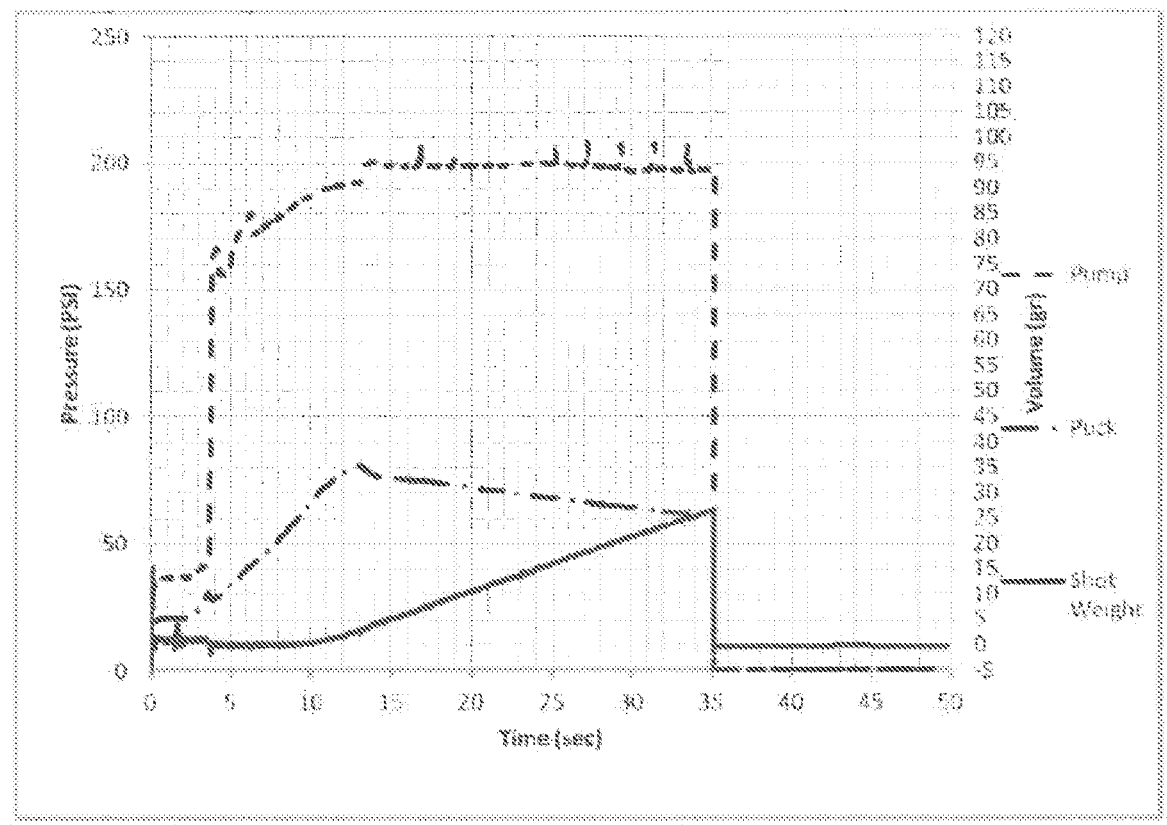
FIG. 11 is a graph of the pressure and volume changes with the grinder set at −60.

FIGS. 9, 10 and 11 show that finer espresso grounds cause the puck pressure to reach a higher pressure, as compared with less-fine grounds. The pump pressure over time for each of the three sample types is similar, with the pressure levelling out (at approximately 200 PSI) at the time when the puck pressure reaches its maximum level. The finer grounds reach this point later than the coarser grounds.

Figure 12:
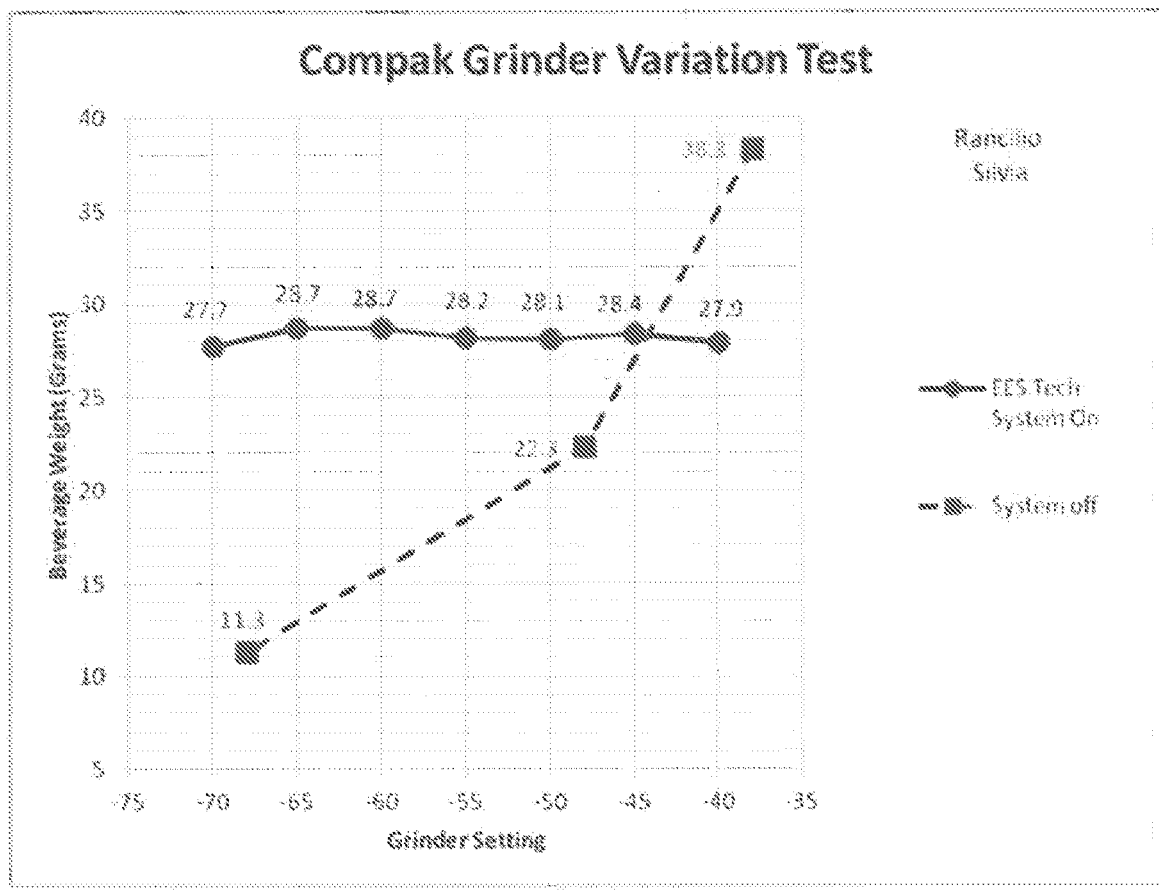
FIG. 12 is a graph of the results of a Compak grinder test at 28.5 gram shot.
Figure 13:
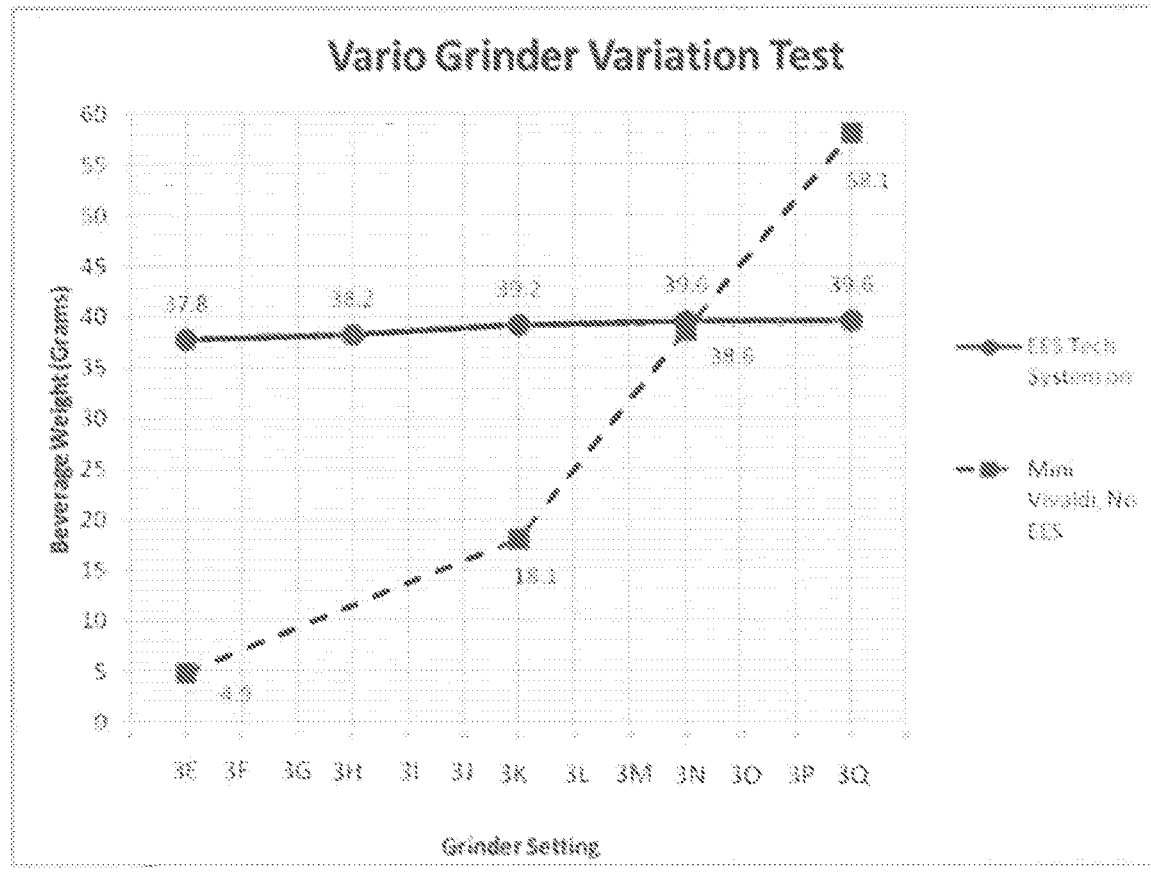
FIG. 13 is a graph of the results of a Vario grinder test at 38.9 gram shot.
Figure 14:
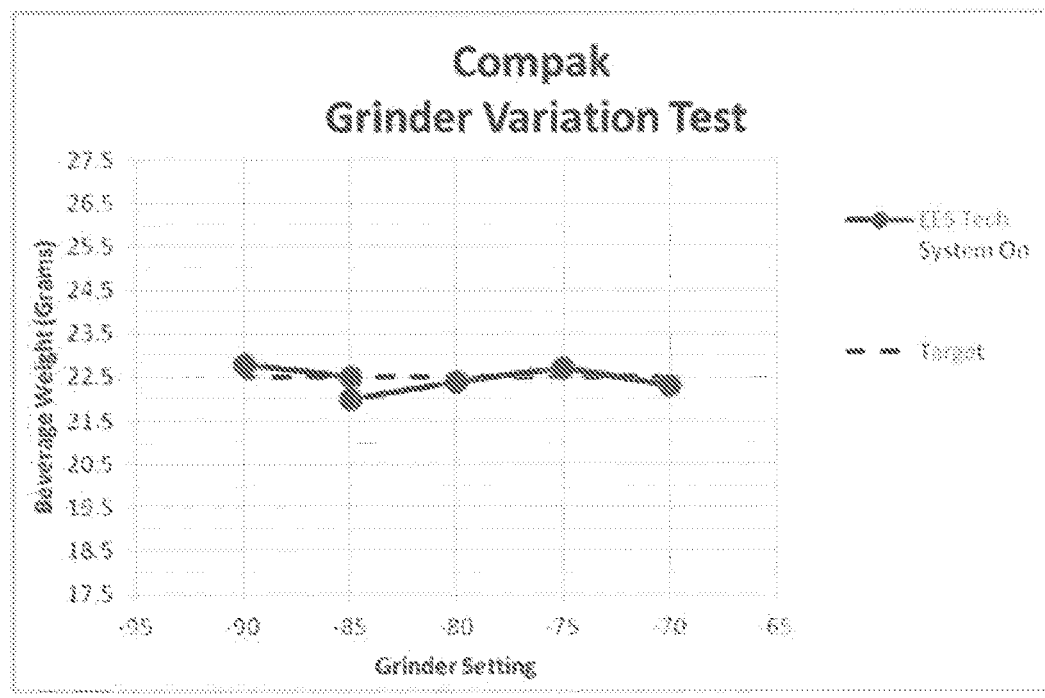
FIG. 14 is a graph of the results of a Compak grinder test at 22.5 gram shot.

The following FIGS. 12, 13 and 14 shows a comparison of an embodiment of the present invention using flow-controlled Pre-Infusion and Extraction Tables, labelled EES Tech, in relation to other systems, to compare how the grinder setting influences the resulting shot weight. All shots represented on a graph were pulled at the same shot weight with the disclosed system and use same brewing parameters. Of primary importance on FIG. 12 are the parameters of shot weight of 28.5 grams and shot time of 25 seconds. The same dose of 20 grams was used for all shots. Brewing parameters did not change for the different shot weights. The graphs show that by using the system disclosed herein, the beverage weight remains relatively constant, regardless of the grinder setting. For other systems, however, the grinder setting directly influences the resulting shot weight. For the shots measured when the system was off, a timer was used to stop the shot at 25 seconds.

Figure 15:
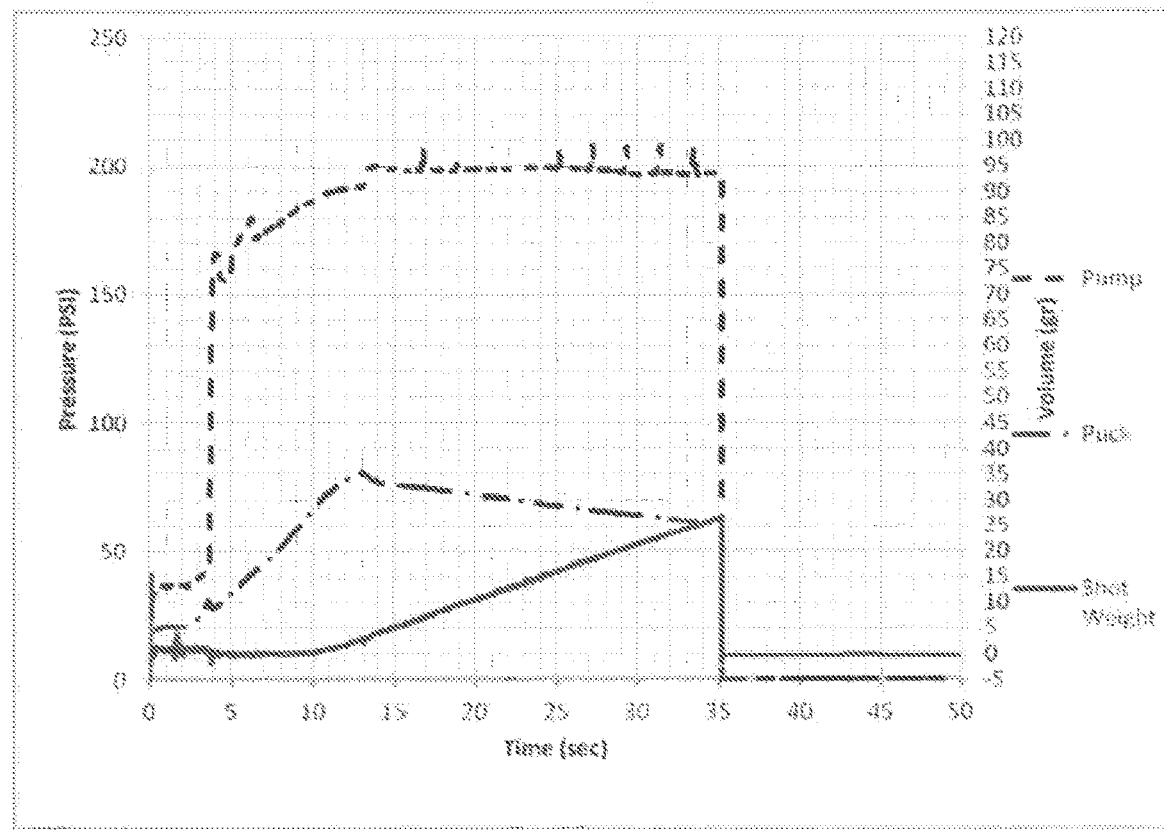
FIG. 15 is a graph of the pressure and volume changes with an 8-day old roast.
Figure 16:
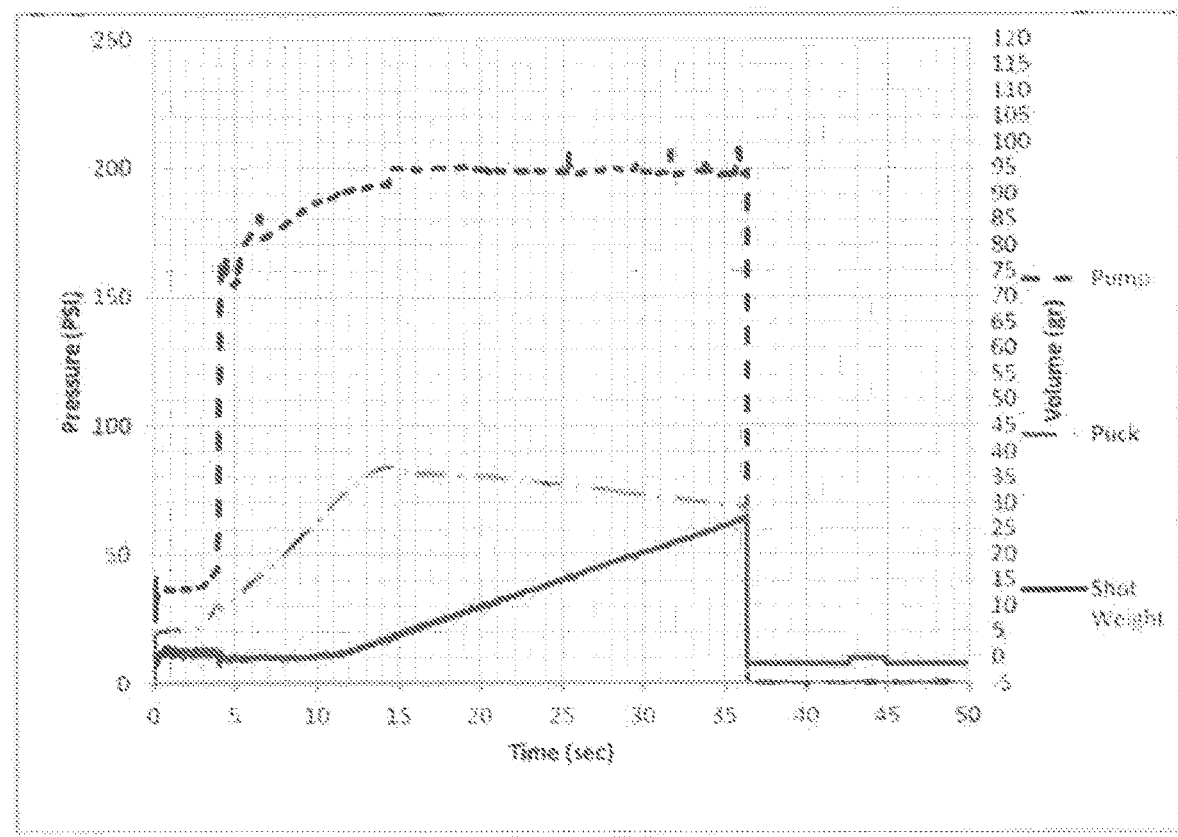
FIG. 16 is a graph of the pressure and volume changes with a 1-day old roast.

The following FIGS. 15 and 16 shows the minimal effect of roast date on achieving the desired shot, as best viewable as in the similarity in the extraction curves. This shows that the same parameters create a repeatable brewing environment which minimizes the differences in type of roast, including roast date, and allow a user to pull the same shot.

Figure 17:
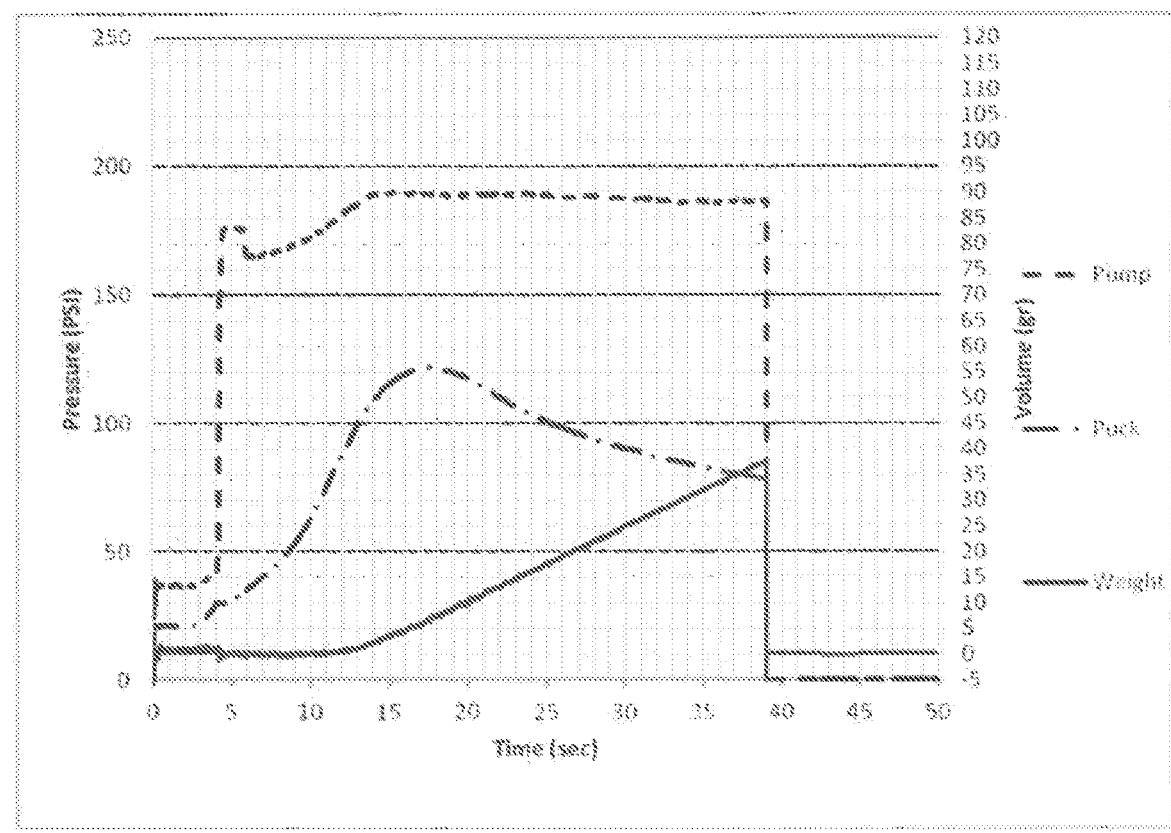
FIG. 17 is a graph of the results of a test at 38.9 gram shot.
Figure 18:
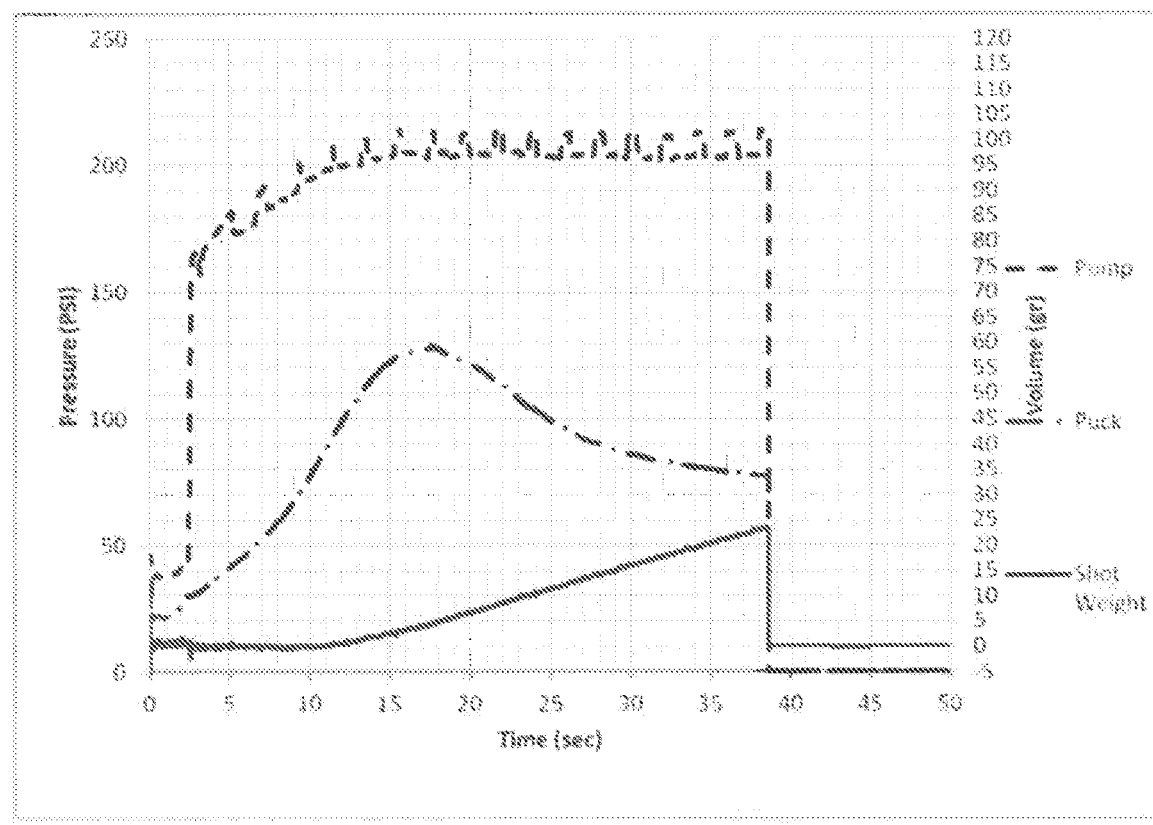
FIG. 18 is a graph of the results of a test at 22.5 gram shot.

The next set of examples, FIGS. 17 and 18 show shots with different target shot weights of 38.9 grams and 22.5 grams, respectively. Shot weight is a programmable brewing parameter that can easily be changed by the user with this system. Note the weight or extraction line in both examples is a ramp with a different slope of increasing extraction weight over a similar extraction time as a result of programmable flow rate control during extraction. In other words, if the system is programmed to produce a higher-weight shot in the same shot time, an increased flow is applied.

Figure 19:
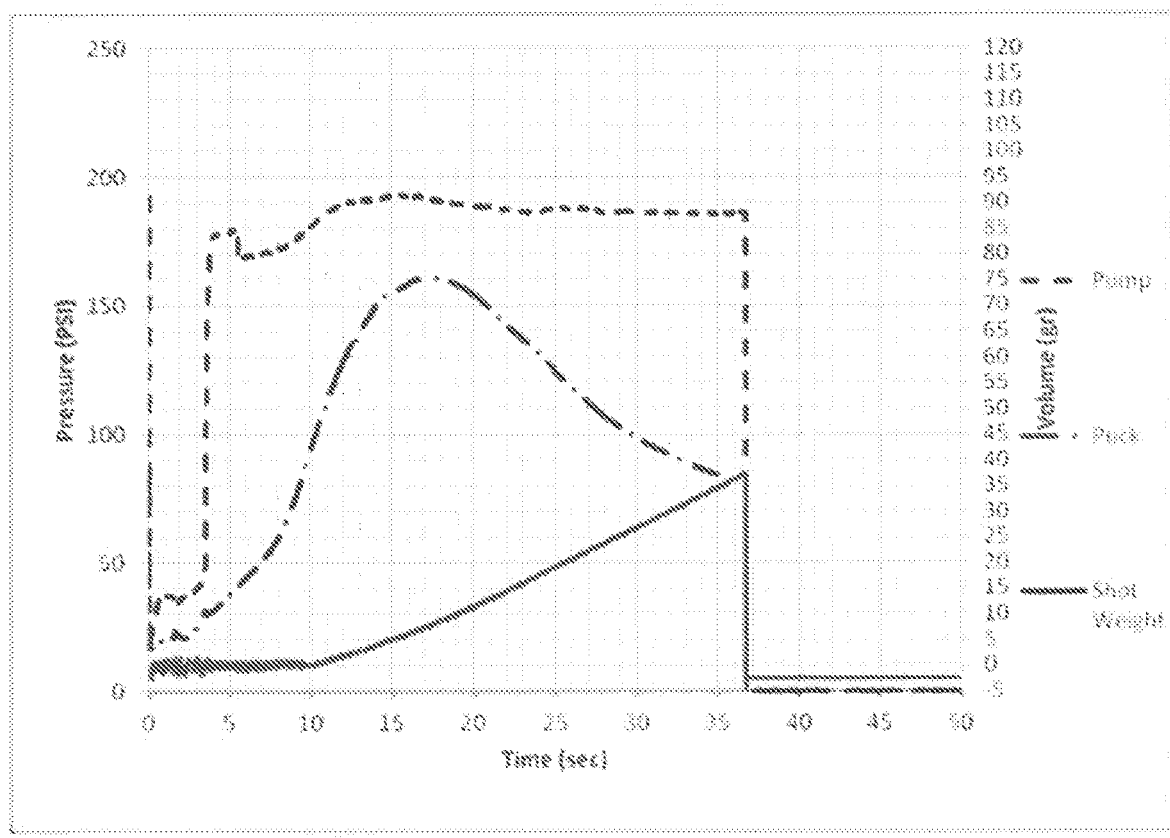
FIG. 19 is a graph of the pressure and volume changes with a 5/16 brew date.
Figure 20:
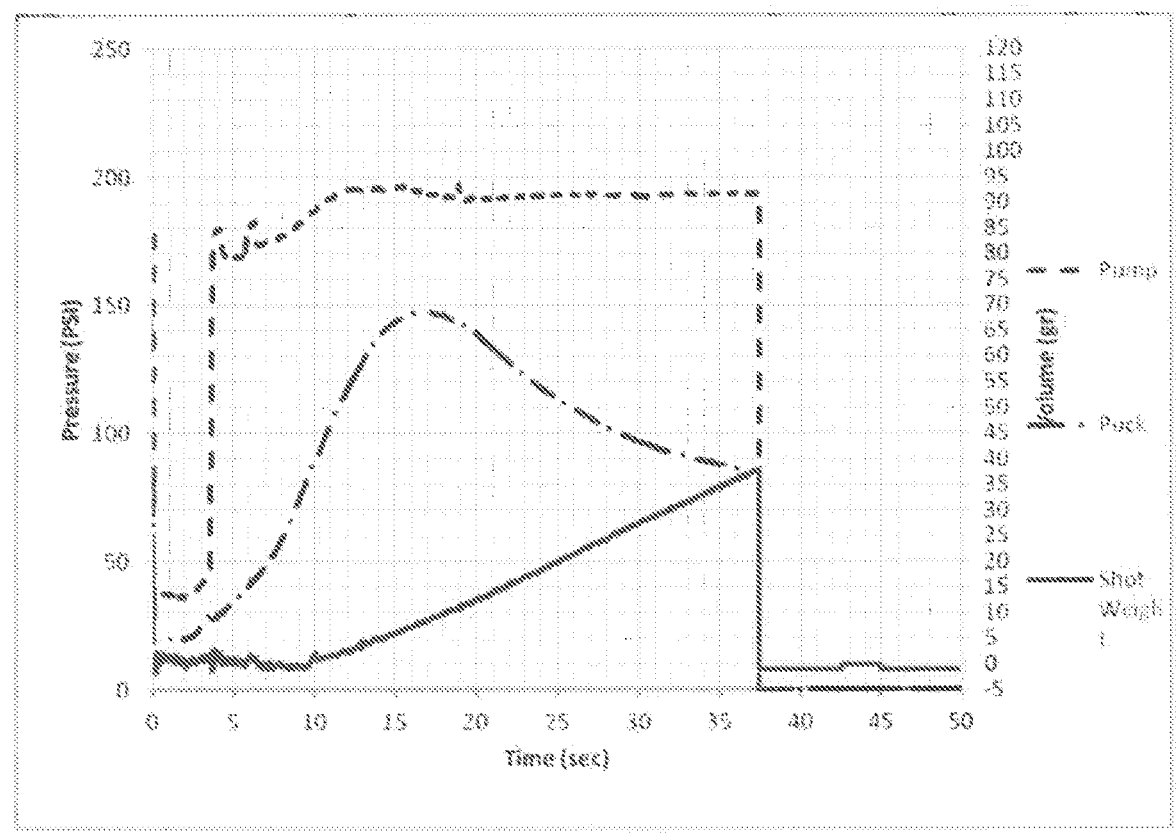
FIG. 20 is a graph of the pressure and volume changes with a 9/14 brew date.

The following FIGS. 19 and 20 are examples of shots performed four months apart, with different grinders, different roast dates, but with the same Pre-Infusion Table and nearly the same Extraction Table. One shot was for 39 grams and the second shot was for 38.9 grams. Dose for both was 20 grams. The similarity of the extraction behavior as shown in the solid line for shot weight is noted.

Figure 21:
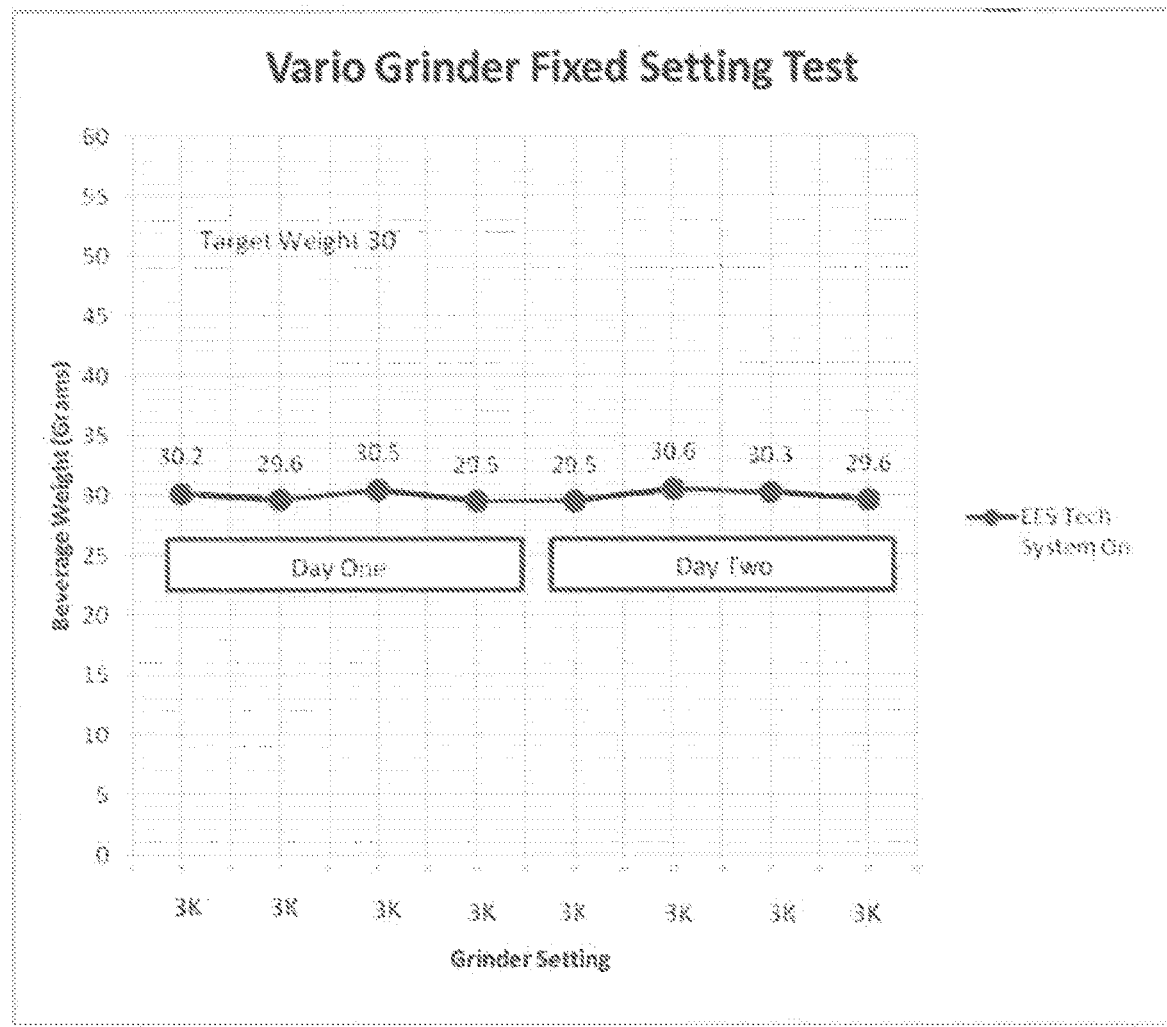
FIG. 21 is a graph of the beverage weight of several test samples.

FIG. 21 shows how a profile may be used with a succession of shots, while maintaining the grinder setting, to get consistent shots very close to the input target shot weight. A generally accepted variation of shot weight in a cafe is a shot weight within 2 grams of the target shot weight. In the example shown in FIG. 21, the target weight is 30 grams, shots were taken throughout the day over a two-day period and the system was operated in fully automatic mode.

In an embodiment of the present invention, a mechanical assembly 10 in conjunction with a system controller 16 and other electronics enables the previously-described system algorithms to programmatically configure the espresso machine to brew the shot desired by the barista. The assembly 10 and system controller 16 allows for changing of brewing characteristics nearly instantly and without any manual adjustment of the espresso machine.

For example, FIG. 4 represents the components of a mechanical assembly 10 and its connections to a system controller 16. The water path is shown as bold lines with arrows indicating flow direction from the water supply 23 through the pump 26. The path of the water during fill is through the bypass valve 4 to the group head 17. The path of the water after it passes through the pump 26 during pre-infusion and extraction is through the control valve 3, the flow meter 8 and to the group head 17. The use of the flow meter 8 and the control valve 3, in combination with real time, closed feedback loop algorithms enabled by system controller electronics 16, provide the means to control water flow rate through the mechanical assembly 10 and into the coffee puck. The flow meter 8 output pulses are counted, and pulse timing is measured, system controller 16 to determine an estimate of the water flow rate. The measured flow rate is compared to a table of flow rates and controlled to match the flow rate in the table. In one embodiment, one table of flow rates is generated for pre-infusion and a second table is generated for extraction, as previously exemplified. If the measured flow rate is not equal to the current "target" flow rate, then the system electronics 16 changes the control signal to the control valve 3 to change the valve opening. For example, in an embodiment, the control signal is a current that ranges from 0 mA to 200 mA. At 0 mA the control valve 3 is completely closed, and at 200 mA, the valve 3 is completely open. Other current ranges are possible with different valve selections. Other control means could be a voltage applied to the coil or the use of a pulse width modulated (PWM) signal to create a control voltage for a voltage driver, an average current through a coil or a reference voltage for a current driver.

The bypass valve driver 20 is configured to turn on or off the bypass valve 4. The control valve driver 22 is configured to apply a current and is capable of very small current changes to enable fine control of the valve during flow rate control. The espresso machine system electronics 24 control the pump and three way valve in the group head 17 during the brewing of the espresso. The user entry means 28 may be a phone or tablet application and connected via Bluetooth for example. Or the input device could be a keyboard or touchscreen on the espresso machine and connected directly to the espresso machine system electronics.

The behavior of the control valve 3 is a function of the differential pressure across the valve. The differential pressure is dominated by the pump pressure minus the puck pressure, measured by the first or pump pressure sensor 2 and the second or puck pressure sensor 15 in FIG. 4. There are small pressures generated by the flow restriction of the plumbing path and attached components. One advantage of measuring the pump pressure and puck pressure is that the small effects on pressure due to the flow restriction of the plumbing path are taken into account and the differential pressure is measured accurately. For a given valve setting, the flow rate will be different for a differential pressure of 10 psi or 150 psi for example. For a system with a manual flow control valve, the performance of the valve changes as the pressure changes across it but usually the barista will not change the manual valve during the shot. The equation for the valve performance is CV=flow rate (gal/min)/Square root (Inlet pressure−output pressure). CV represents the setting of the valve and affective aperture size. Flow rate is equal to CV*square root (input pressure−output pressure) which indicates that the differential pressure is important for the resulting flow rate. An alternate embodiment would be to not have a pump pressure sensor, but to estimate the initial pump pressure at the initial flow rate for pre-infusion to pre-set the valve to the starting setting. Then the control loop would adjust the control valve as needed making assumptions about the actual inlet (pump) pressure. The control loop control would maintain the target flow rate and minimize the error of not having the actual inlet or pump pressure.

For smaller pumps, the pump pressure changes greatly as the flow rate changes. A small vibratory pump, for example, can have an output pressure of near zero when performing at the maximum flow rate. The peak pump pressure occurs with no output flow rate. For example, in a smaller pump, the pump pressure may vary from approximately 0 bar (or PSI) at the maximum flow rate (650 cc/min), to approximately 15 bar (218 PSI) for a flow rate of 0 cc/min. During a shot, the puck pressure starts at near 0 and increases to higher pressures that can range, for example, from 5 bar (72 PSI) to 11 bar (160 PSI) for example. The closed loop control of the flow rate takes the measured pressures into account to properly control the control valve for the desired flow rate. The effect on the shot due to changes in the differential pressure throughout the shot are minimized with the closed loop control. Commercial espresso machines have pumps that maintain higher pressure even at higher flow rates. This system can handle either kind of pump pressure characteristic due to the closed loop control of flow rate.

Typical espresso machines have a pressure limit of about 9 bar (131 PSI). When the pump is turned on, the pressure is applied to the puck, resulting in a flow of water into the puck depending on the puck permeability. Since flow rate is controlled over a range of puck pressures, as described herein, the upper limit in the embodiment is higher than in a standard espresso machine to allow a higher pressure to exist if the puck permeability is lower than expected due to variations in puck preparation. Some machines experience a pump pressure variation during the cycling of the heater in the boiler. The closed loop control described herein minimizes the effect of pump pressure variations on the flow rate of water into the puck.

Figure 5:
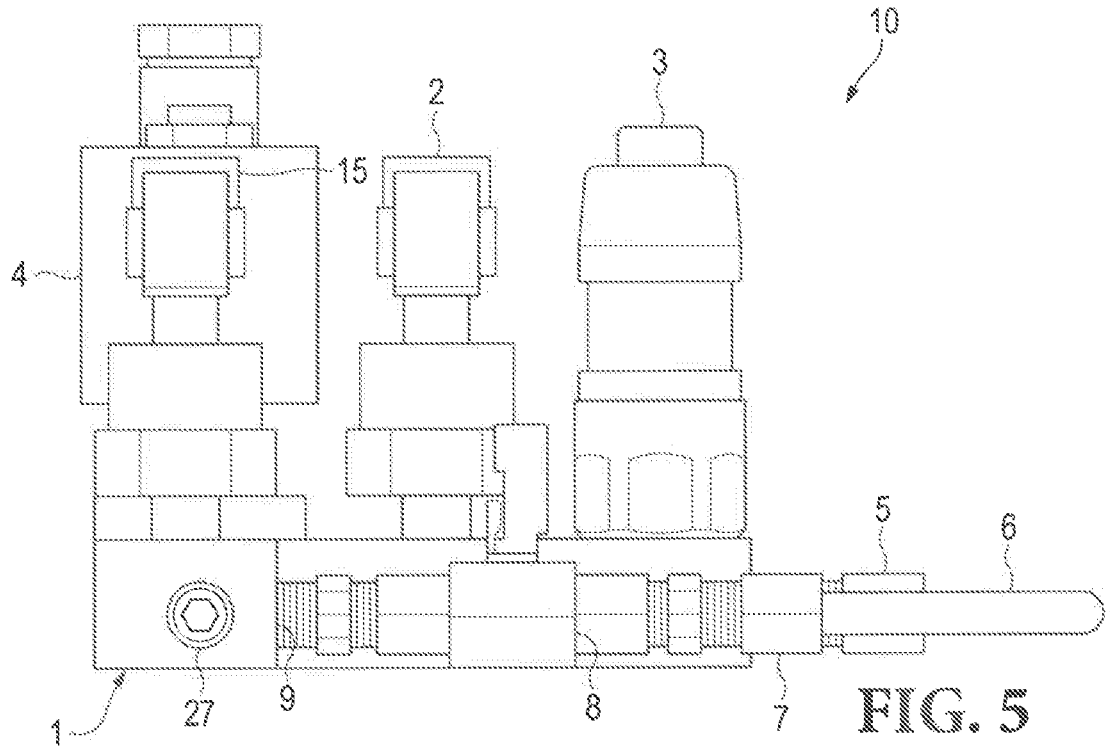
FIG. 5 is a side elevational view of an embodiment of the mechanical system.
Figure 6:
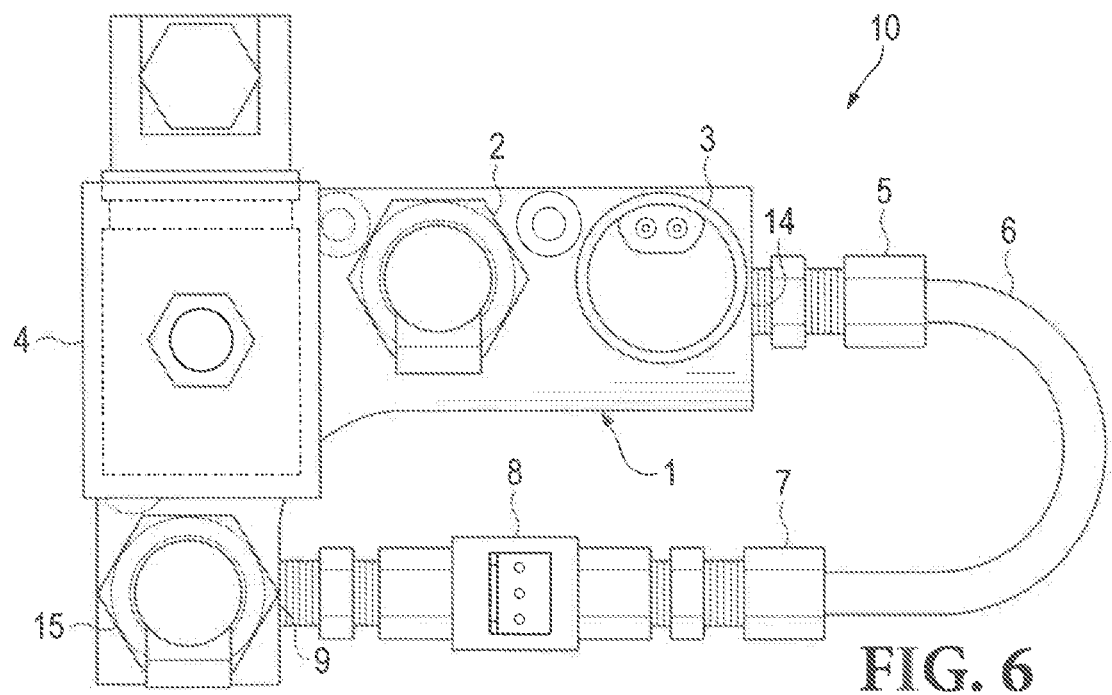
FIG. 6 is a top plan view of the embodiment of the mechanical system shown in FIG. 5.
Figure 7:
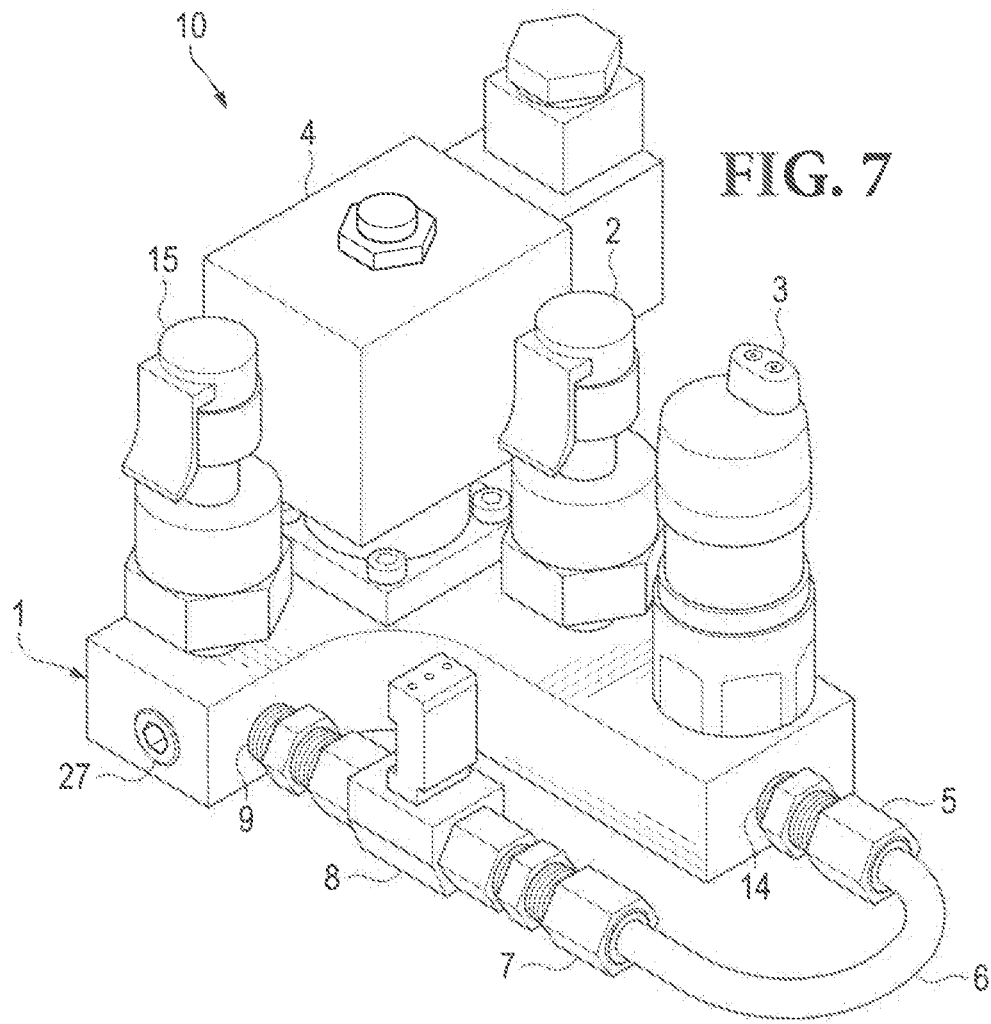
FIG. 7 is an isometric view of the embodiment of the mechanical system shown in FIG. 5.
Figure 8:
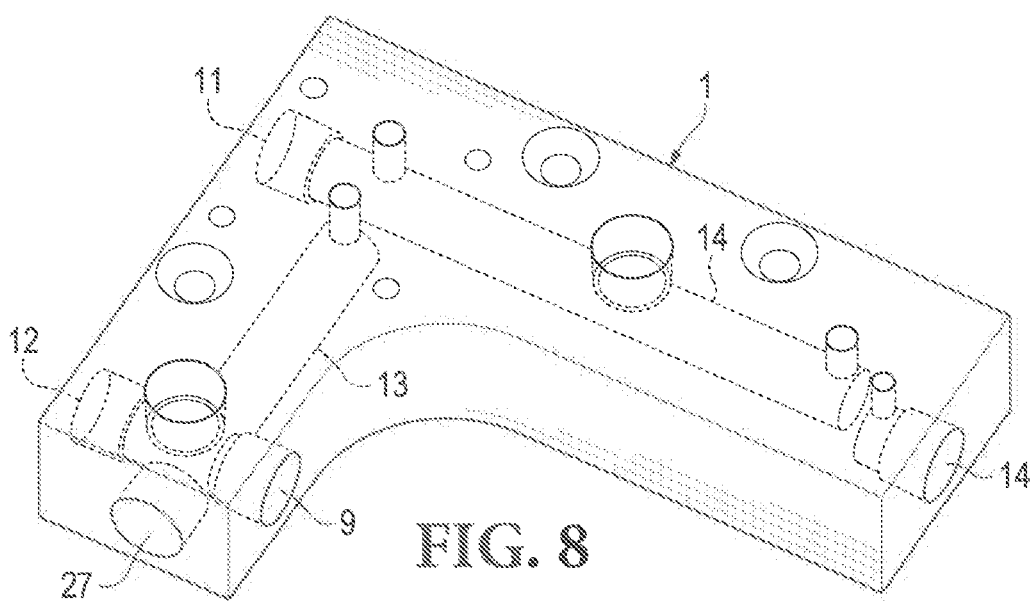
FIG. 8 is an isometric view of an embodiment of the manifold.

FIGS. 5-7 are three views of an embodiment of the present invention. FIG. 8 is a view of the manifold. The assembly includes a first water path 14 that begins at an inlet port 11, and is connected to a bypass valve 4. The connection of the water path 14 to the bypass valve 4 enables high flow rates during fill. The bypass valve 4 is open during fill to allow a higher flow rate into the puck area to quickly fill the empty volume above the puck and in the plumbing of the espresso machine. The water path 14 continues to a first or pump pressure sensor 2 to measure the pump pressure, and then to control valve 3 to regulate water flow rate. The water in the water path 14 then flows through a pipe connection 5 and through tube 6, through connection 7, to flow meter 8 to measure water flow rate and then to a second pressure sensor 15 to measure puck pressure followed by through to a fluid connection 9 to fluid connection 12. From fluid connection 12, the water path is to the group head 17, shown in FIG. 4. A second water path 13 begins at the output of the bypass valve to the second or puck pressure sensor 15. Plug 27 fills a hole to enable the machining of the second water path 13, in FIG. 8.

FIG. 4 shows the bypass water path going around the flow meter. Alternatively, the flow meter may be included in the bypass valve water path so that all the water into the grouphead passes through the flow meter. The puck pressure sensor could be mounted on the grouphead water path to the puck. The flow meter could be mounted anywhere between the 2 valves on the manifold and the water inlet to the boiler.

Pre-infusion begins at the first pressure in the pre-infusion table which is generated by the algorithms of the system, as previously explained. When pre-infusion starts, the bypass valve 4 closes and water then flows through the primary water flow path 14, that runs from the inlet port 11, which is under the first or pump pressure sensor 2, and extends from first pressure sensor 2 to the inlet of the control valve 3. The outlet of the control valve 3 is connected to the fitting for the pipe connection 5. The path continues through the tube 6 to the flow meter 8, then into the manifold 1 again to connect with the outlet pressure sensor 2 and then to the output port 12. This path is also the primary path during extraction. The primary water path includes the flow meter 8 with which the flow rate of the water during pre-infusion and extraction to enable the system controller 16 to dynamically and in real time control the flow rate per the Pre-Infusion and Extraction Tables. In an alternate construction, the normally closed bypass valve could be replaced with a normally open valve to allow the system input pressure to be applied when the machine is idle. When the shot starts, the bypass value would remain open to increase the flow rate during fill. When fill is complete and pre infusion starts, the valve would be closed so that all the water flowed through the control valve.

The electrical connections between the manifold 1 components and the system controller 16 include: bypass valve control signal, control valve control signal, inlet and outlet pressure sensor powers, returns and output signals and the flow meter sensor power, return and output signal.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

I claim:

1. A method for determining an amount of water and a flow rate of water for extraction of coffee from an espresso puck during an espresso shot in a brewing system, the method comprising:
   a) determining an amount of water needed for the espresso shot in accordance with a target espresso shot weight, a dry coffee dose, and an extraction percent;
   b) determining an average flow rate from the amount of water needed and a determined espresso shot time;
   c) applying one or more adaptations to the flow rate, wherein the adaptations include changes applied to the flow rate in response to changes in a puck permeability.

2. The method of claim 1, wherein the step of determining the amount of water needed for the espresso shot is calculated by an espresso shot weight−(dry coffee dose*extraction percent).

3. The method of claim 1, wherein the step of determining the average flow rate includes a step of dividing the amount of water needed by the determined espresso shot time.

4. The method of claim 1, further including a step of calculating a number of control loop updates, n, during the espresso shot by dividing the determined espresso shot time by a time interval between two control updates.

5. The method of claim 1, wherein the step of applying one or more adaptations includes a step of determining a Starting Extraction Flow rate which is equal to (Amount of water needed/Shot time)*(1+Extraction Flow Rate Adjustment).

6. The method of claim 1, wherein the step of applying one or more adaptations includes a step of determining a Flow Rate for each control period.

7. The method of claim 6, further including a step of repeating all steps to formulate an extraction table.

8. The method of claim 1, further comprising a step dynamically compensating for changes in the puck during extraction by controlling extraction flow rates.

9. The method of claim 1, further including a step of adjusting for water density differences between water temperature at the flow meter and boiler water temperatures.

10. The method of claim 1, further including the step determining compensation for water flow that does not go into the puck after extraction detection such that:

$$V\text{adjustment (grams)}=V\text{empty volume of system (grams)}*[\{14.7\gamma/P\text{ext (PSI)}\}-\{14.7\gamma/P\text{peak (PSI)}\}], \text{derived from } VP=V_0P_0 \text{ and where } \gamma \text{ is an adjustment for elevation above sea level or alternately derived from } P_0\gamma/P=(V/V_0)^\gamma.$$

11. The method of claim 1, further including the step of determining compensation for water flow that does not go into the puck after extraction detection such that:

$$V\text{empty volume of system (grams)}*[\{14.7\gamma/P\text{ext (PSI)}\}-\{14.7\gamma/Pn \text{ (PSI)}\}], Pn=\text{to a puck pressure during extraction}.$$

12. The method of claim 1, further comprising the step of compensating for water flow that does not go into the puck after extraction detection.

13. The method of claim 1, further comprising a step of using a flow meter to measure a flow rate of the water by determining fractional edges during a control interval, using several counts from the capture register, saving the counts in order, the counts being: start of control interval (0), first flow meter edge(1), flow meter edge(−2), flow meter edge(−1), flow meter edge(n−1), last flow meter edge(n), and the end of the (current) control interval (0).

14. The method of claim 1, further including the steps of:
   a) calculating a first period of the flow meter edges in the control interval using P(1)=flow meter edge(−1)−flow meter edge(−2)
   b) calculating the fraction f(0) of the edge from the first control interval (0) to the first flow meter edge (1) using f(0)=[first flow meter edge(1)−start of control interval (0)]/[flow meter edge(−1)−flow meter edge(−2)]
   c) calculating the fraction of the edge from the last flow meter edge (n) to the end of the control interval (n) using f(n)=[end of control interval (x)−flow meter edge(n)]/[flow meter edge(n)−flow meter edge(n−1)]; and
   d) comparing the control interval edge count to the edge counts calculated from the previously-determined flow rates.

* * * * *